United States Patent
Valsvik et al.

(10) Patent No.: US 10,322,783 B2
(45) Date of Patent: Jun. 18, 2019

(54) SEISMIC AUTONOMOUS UNDERWATER VEHICLE

(71) Applicant: Seabed Geosolutions B.V., Leidschendam (NL)

(72) Inventors: Geir Valsvik, Laksevag (NO); Arne Henning Rokkan, Olsvik (NO); Johan Fredrik Næs, Trondheim (NO); Matthew E. Silvia, Pocasset, MA (US); Christopher J. von Alt, Pocasset, MA (US)

(73) Assignee: Seabed Geosolutions B.V., Leidschendam (NL)

( * ) Notice: Subject to any disclaimer, the term of this patent is extended or adjusted under 35 U.S.C. 154(b) by 12 days.

(21) Appl. No.: 15/292,816

(22) Filed: Oct. 13, 2016

(65) Prior Publication Data
US 2017/0137098 A1 May 18, 2017

Related U.S. Application Data

(60) Provisional application No. 62/242,693, filed on Oct. 16, 2015.

(51) Int. Cl.
*B63G 8/22* (2006.01)
*B63G 8/39* (2006.01)
(Continued)

(52) U.S. Cl.
CPC .............. *B63G 8/39* (2013.01); *B63G 8/001* (2013.01); *B63G 8/08* (2013.01); *B63G 8/16* (2013.01);
(Continued)

(58) Field of Classification Search
CPC ... B63G 8/08; B63G 8/38; B63G 8/39; B63G 8/001; B63G 2008/002; B63G 2008/004;
(Continued)

(56) References Cited

U.S. PATENT DOCUMENTS

| 3,256,849 A | 6/1966 | Wolfgang |
| 3,492,965 A | 2/1970 | Wayfield |

(Continued)

FOREIGN PATENT DOCUMENTS

| EP | 1217390 A1 | 6/2002 |
| EP | 1319964 A2 | 6/2003 |

(Continued)

OTHER PUBLICATIONS

European Search Report, Ref: PP01726 MP/VR—Application No. 16193961.6-1754, European Patent Office, Germany dated Mar. 15, 2017.

(Continued)

*Primary Examiner* — Andrew Polay
(74) *Attorney, Agent, or Firm* — Park, Vaughan, Fleming & Dowler LLP; Shane Nelson

(57) ABSTRACT

Apparatuses, systems, and methods for the deployment of a plurality of seismic autonomous underwater vehicles (AUVs) on or near the seabed. In one embodiment, the AUV comprises a buoyant body coupled to a pressure vessel that contains substantially all of the AUV's electronic components. The pressure vessel may comprise a plurality of composite components coupled together by a metallic ring to provide a substantially cylindrical shape to the pressure vessel. The AUV body provides lift to the AUV during lateral movement and compensates for an overall negative buoyancy of the AUV. The AUV may include a plurality of thrusters for propulsion. A vertical thruster may be used to create an upwards attack angle during takeoff and to maintain depth and orientation during flight. During normal flight operations, the AUV is configured to travel horizontally and vertically in a body of water by using only the horizontal thrusters.

26 Claims, 9 Drawing Sheets

(51) Int. Cl.
  *B63G 8/00* (2006.01)
  *G01V 1/38* (2006.01)
  *B63G 8/08* (2006.01)
  *B63G 8/16* (2006.01)

(52) U.S. Cl.
  CPC .......... *G01V 1/3808* (2013.01); *G01V 1/3852* (2013.01); *B63B 2211/02* (2013.01); *B63G 2008/004* (2013.01)

(58) Field of Classification Search
  CPC ........ B63G 2008/005; B63G 2008/007; B63G 8/16
  See application file for complete search history.

(56) References Cited

U.S. PATENT DOCUMENTS

| | | | |
|---|---|---|---|
| 5,253,605 | A | 10/1993 | Collins |
| 5,758,592 | A | 6/1998 | Benson |
| 5,894,450 | A | 4/1999 | Schmidt et al. |
| 6,230,840 | B1 | 5/2001 | Ambs |
| 6,390,012 | B1 | 5/2002 | Watt et al. |
| 6,474,254 | B1 | 11/2002 | Ambs et al. |
| 6,482,054 | B2 | 11/2002 | Treaster |
| 6,625,083 | B2 | 9/2003 | Vandenbroucke |
| 6,779,475 | B1 | 8/2004 | Crane et al. |
| 6,829,197 | B2 | 12/2004 | Erikson |
| 6,932,185 | B2 | 8/2005 | Bary et al. |
| 6,951,138 | B1 | 10/2005 | Jones |
| 7,016,260 | B2 | 3/2006 | Bary |
| 7,124,698 | B1 | 10/2006 | Shen et al. |
| 7,148,416 | B1 | 12/2006 | Rice |
| 7,183,742 | B2 | 2/2007 | Potter |
| 7,252,046 | B1 | 8/2007 | Ead et al. |
| 7,796,466 | B2 | 9/2010 | Combee et al. |
| 7,965,583 | B2 | 6/2011 | Thomas |
| 8,025,021 | B2 | 9/2011 | Gosling |
| 8,074,592 | B2* | 12/2011 | Schroder .................. B63G 8/08 114/338 |
| 8,096,254 | B1 | 1/2012 | Bauer et al. |
| 8,109,223 | B2 | 2/2012 | Jamieson |
| 8,576,658 | B2 | 11/2013 | Thomas |
| 8,677,921 | B2 | 3/2014 | Gosling |
| 8,717,844 | B2 | 5/2014 | Walker et al. |
| 9,052,380 | B2 | 6/2015 | Winter et al. |
| 9,090,319 | B2* | 7/2015 | Brizard ................... B63C 11/42 |
| 9,174,713 | B2 | 11/2015 | Item |
| 9,829,589 | B2 | 11/2017 | Ray et al. |
| 2007/0051292 | A1 | 3/2007 | Kilbourn et al. |
| 2010/0000459 | A1 | 1/2010 | Colangelo |
| 2010/0157727 | A1 | 6/2010 | Woodard, Jr. et al. |
| 2010/0182870 | A1 | 7/2010 | Norris et al. |
| 2010/0302901 | A1 | 12/2010 | Welker et al. |
| 2011/0297121 | A1 | 12/2011 | Kraus et al. |
| 2012/0020185 | A1 | 1/2012 | Welker |
| 2012/0057430 | A1 | 3/2012 | Rouquette et al. |
| 2012/0069702 | A1 | 3/2012 | Muyzert et al. |
| 2012/0210836 | A1 | 8/2012 | Wiggins et al. |
| 2012/0289103 | A1 | 11/2012 | Hudson et al. |
| 2013/0269585 | A1* | 10/2013 | Kim ....................... B63G 8/001 114/331 |
| 2014/0053768 | A1 | 2/2014 | Brizard |
| 2014/0140170 | A1 | 5/2014 | Brizard |
| 2014/0251199 | A1 | 9/2014 | Brizard |
| 2014/0290554 | A1 | 10/2014 | Brizard |
| 2014/0301161 | A1 | 10/2014 | Brizard |
| 2015/0136012 | A1* | 5/2015 | Williams ............... B63G 8/001 114/312 |
| 2015/0210359 | A1 | 7/2015 | McClure |
| 2017/0240257 | A1* | 8/2017 | Brandt ................... B63G 8/001 |

FOREIGN PATENT DOCUMENTS

| | | |
|---|---|---|
| GB | 20141301 A | 9/1980 |
| GB | 2163114 | 2/1986 |
| WO | 2001073477 A2 | 10/2001 |
| WO | 2009039488 A1 | 3/2009 |
| WO | 20110106237 A2 | 9/2011 |
| WO | 2012013171 A1 | 2/2012 |
| WO | 2012013962 A1 | 2/2012 |
| WO | 2012085590 A2 | 6/2012 |
| WO | 20130411838 A2 | 3/2013 |
| WO | 2013045669 A1 | 4/2013 |
| WO | 201136076488 A1 | 5/2013 |
| WO | 2013128187 A1 | 6/2013 |
| WO | 2013128188 A1 | 6/2013 |
| WO | 2014096265 A2 | 6/2014 |

OTHER PUBLICATIONS

Yoerger et al.; "Fine-Scale Seafloor Survey in Rugged Deep-Ocean Terrain with an Autonomous Robot", Proceedings, ICRA, International Conference on Robotics and Automation, San Francisco, CA, Apr. 2000; ISBN 0-7803-5886-4 pp. 1787-1792.

Duey, Rhonda; "Flying Nodes Shift Marine Seismic Paradigm" Dec. 1, 2011; pp. 1-2 [downloaded on Feb. 28, 2012; http://www.epmag.com/item/print/Flying-Nodes-Shift-Marine-Seismic-Paradigm-92689].

Hayakudome, Tadahiro; Design of Autonomous Underwater Vehicle, Japan Agency for Marine-Earth Science and Technology (JAMSTEC), Japan International Journal of Advanced Robotic Systems; vol. 8, No. 1 (2011) ISSN 1729-8806; pp. 122-130; [downloaded from http://www.intechopen.com/journals/international_journal_of_advanced_robotic_systems/design-of-autonomous-underwater-vehicle].

Yoshida, Hiroshi et al; "New Attempts in the MR-X1 Sea-Trials: The Working AUV Tries to Survey of the Sea Floor and to Take Mud Samples", Paper No. OMAE-2010-20347; Proceedings of the ASME 2010 29th International Conference on Ocean, Offshore and Arctic Engineering: Jun. 6-11, 2010; Shanghai, China [Downloaded from http://proceedings.asmedigitalcollection.asme.org/ on Nov. 25, 2015].

International Search Report in corresponding International Application No. PCT/EP2012/069144, dated Feb. 4, 2013.

Written Opinion in corresponding International Application No. PCT/EP2012/069144, dated Feb. 4, 2013.

International Search Report in corresponding International Application No. PCT/EP2012/069145, dated Feb. 6, 2013.

Written Opinion in corresponding International Application No. PCT/EP2012/069145, dted Feb. 6, 2013.

Cranford, A Direct-Recording Ocean-Bottom Seismograph, Bulletin of the Seismological Society of America, vol. 66, No. 2, 607-615 (Apr. 1976) ("Cranford").

Mattaboni, MITOBs: A Seismometer System for Ocean-Bottom Earthquake Studies, Marine Geophysical Researches 3 (1977), pp. 87-102 ("Mattaboni").

http://www.carrack.co.uk/minidobs.htm ("Carrack"), Carrack Measurement Technology, downloaded Jun. 20, 2017.

Willoughby, A Microprocessor-Based Ocean-Bottom Seismometer, Bulletin of the Seismological Society of America, vol. 83, No. 1., 190-217 (Feb. 1993) ("Willoughby").

Prothero, First Noise and Teleseismic Recordings on a New Ocean Bottom Seismometer Capsule, Bulletin of the Seismological Society of America, vol. 74, No. 3, 1043-1058 (Jun. 1984) ("Prothero").

Johnson, A Free-Fall Direct-Recording Ocean Bottom Seismograph, Marine Geophysical Researches 3 103-117 (1977) ("Johnson").

Sutton, Optimum Design of Ocean Bottom Seismometers, Marine Geophysical Researches 9 (1987), pp. 47-65 ("Sutton").

Schmalfeldt, Explosion-Generated Seismic Interface Waves in Shallow Water: Experimental Results, Saclantcen Report SR-71 (1983) ("Schmalfeldt").

Eguchi, A real-time observation network of ocean-bottom-seismometers deployed at the Sagami trough subduction zone, central Japan, Marine Geophysical Researches 20: 73-94, 1998 ("Eguchi").

Kirk, A Three-Component Ocean Bottom Seismograph for controlled Source and Earthquake Seismology, Marine Geophysical Researches 5, 1982, 327-341 ("Kirk").

(56) References Cited

OTHER PUBLICATIONS

Petition for Inter Partes Review of U.S. Pat. No. Re. 45,268, dated Apr. 27, 2018.
Petition for Inter Partes Review of U.S. Pat. No. 8,879,362, dated Apr. 27, 2018.
Petition for Inter Partes Review of U.S. Pat. No. 8,228,761, dated Apr. 27, 2018.
Arran Holloway et al., "The future of deepwater ocean bottom seismic—Are flying nodes the next big step?", SEG New Orleans Annual Meeting 2015, p. 115-119.
Arran Holloway, "Using Robotic Flying Nodes for Seabed Seismic Data", WS18 D02, 78th EAGE Conference & Exhibition 2016—Workshop Programme, Vienna, Austria, May 30-Jun. 2, 2016.

\* cited by examiner

SEISMIC AUTONOMOUS UNDERWATER VEHICLE

PRIORITY

This application claims priority to U.S. provisional patent application No. 62/242,693, filed on Oct. 16, 2015, the entire content of which is incorporated herein by reference.

BACKGROUND OF THE INVENTION

Field of the Invention

This invention relates to marine seismology and more particularly relates to the deployment, retrieval, operation, and design of seismic autonomous underwater vehicles.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through a body of water and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

There are many methods to record the reflections from a seismic wave off the geological structures present in the surface beneath the seafloor. In one method, a marine vessel tows an array of seismic data recorders provided in streamers. In another method, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel. The data recorders may be discrete, autonomous units, with no direct connection to other nodes or to the marine vessel, where data is stored and recorded.

Emerging technologies in marine seismic surveys need a fast and cost effective system for deploying and recovering seismic receivers that are configured to operate underwater. Newer technologies use AUVs that have a propulsion system and are programmed to move to desired positions and record seismic data. In general, the basic structure and operation of a seismic AUV is well known to those of ordinary skill. For example, Applicant's U.S. Pat. No. 9,090,319, incorporated herein by reference, discloses one type of autonomous underwater vehicle for marine seismic surveys.

Because a seismic survey may require hundreds if not thousands of AUVs for a particular survey, an AUV is needed that is easy to operate and relatively straightforward and cost-effective to manufacture. A need exists for an improved AUV that is more cost effective and less complex, one that is lighter and requires less power, and one that is easier to maintain and repair. An improved AUV is needed that more effectively couples to the seabed and can travel to and from a particular point on the seabed without using as much power as may be required by known seismic AUVs.

SUMMARY OF THE INVENTION

Apparatuses, systems, and methods for the deployment and retrieval of a plurality of seismic autonomous underwater seismic vehicles (AUVs) on or near the seabed. In one embodiment, the AUV comprises a streamlined body coupled to a pressure vessel that contains substantially all of the AUV's electronic components. The pressure vessel may comprise a plurality of composite components (such as carbon fiber) coupled to a metallic coupler to provide a substantially cylindrical shape to the pressure vessel. The AUV body may include a plurality of buoyant wings, surfaces, or other parts of the AUV that are configured to provide lift to the AUV in a body of water during lateral movement and to compensate for an overall negative buoyancy of the AUV. The AUV may include a plurality of landing legs or fins for increased stability of the AUV during flight and during rest and increased coupling to the seabed. The AUV may include a plurality of thrusters, such as one vertical thruster located near a front portion of the AUV and two horizontal thrusters located near a middle or a rear portion of the AUV. A vertical thruster may be used to create an upwards attack angle during takeoff and to maintain depth or orientation during flight. During normal flight operations, the AUV may be configured to travel horizontally and vertically in a body of water by using only the horizontal thrusters.

In one embodiment is disclosed an AUV for recording seismic signals on the ocean bottom during a marine seismic survey, the AUV comprising: a body that is positively buoyant, a pressure vessel coupled to the buoyant body that houses a plurality of electronic components within the pressure vessel, a propulsion system configured to propel and steer the AUV while travelling underwater, and one or more seismic sensors configured to record seismic signals while the AUV is resting on the bottom of the ocean.

In another embodiment is disclosed an AUV for recording seismic signals on the seabed during a marine seismic survey, the AUV comprising a pressure vessel that houses a plurality of electronic components within the pressure vessel, wherein an exterior portion of the pressure vessel comprises carbon fiber, and one or more seismic sensors configured to record seismic signals while the AUV is resting on the bottom of the ocean.

The pressure vessel may comprise a plurality of components that may be coupled together, wherein at least one of the components is substantially non-metallic, such as being made of carbon fiber or similar component. For example, an exterior portion of the pressure vessel may comprise one or more carbon-fiber components. In one embodiment, the pressure vessel comprises a first part coupled to a second part by a metallic ring. The first and second parts may be substantially non-metallic, such as being made of carbon-fiber components. The pressure vessel may be cylindrical and comprise a first semi-spherical end coupled to a second semi-spherical end by a metallic ring connector. The metallic ring connector may couple one or more external devices (such as thrusters, altimeters, acoustic devices, etc.) to the internal components of the pressure vessel by a variety of connections, such as a pressure sealed connector, a penetrator, or corresponding flat surfaces on both the external device and the ring connector. In other embodiments, the external devices may be coupled to a separate portion of the pressure vessel, such as a connector or penetrated located in one or more of the ends (such as in a substantially middle portion of the end cap) of the carbon-fiber components.

The AUV may comprise a propulsion system with a plurality of thrusters, such as at least one horizontal thruster and at least one vertical thruster. The at least one vertical thruster may be configured to provide all vehicle pitch control for the AUV and/or provide lift-off force from the seabed for the AUV. The plurality of thrusters may comprise a motor, nozzle, and/or impeller, and in one embodiment the plurality of thrusters are rim driven thrusters. Each of the plurality of thrusters may be coupled to a braking system configured to prevent rotation of the thrusters while the AUV is on the seabed when the AUV propulsion system is powered off.

The AUV may comprise one or more fins or legs coupled to the buoyant body and/or pressure vessel for seabed coupling purposes. In other embodiments, a plurality of legs may comprise a landing frame that couples the buoyant body to the pressure vessel and the AUV to the seabed for increased coupling effects for seismic recordings. The buoyant body may have a plurality of different shapes. In one embodiment, the body has a shape that provides lift to the AUV during horizontal movement of the AUV. While the buoyant body is positively buoyant, overall the AUV may be negatively buoyant in a body of water. The AUV may include an altimeter, which may be partially or entirely located within the pressure vessel or external to the pressure vessel. In one embodiment, the altimeter is located entirely within the pressure vessel, such as being located on an internal side of a carbon-fiber component of the pressure vessel housing.

In one embodiment is disclosed an integrated seismic and AUV control system that is configured to control a seismic payload and the propulsion system. The seismic payload may comprise one or more seismic sensors (such as three geophones and one hydrophone). In one embodiment, the integrated control system comprises a digital autonomous recorder (DAR) configured to control the propulsion system. The DAR may be coupled to an acoustic guidance system located on the AUV.

Also disclosed is a method for performing a marine seismic survey by the use of an AUV. For example, the method may include deploying an AUV to the bottom of the ocean, recording seismic signals on the seabed with one or more seismic sensors located on the AUV, lifting off the AUV from the seabed, and positioning the AUV from a seabed position to a target location in the sea or near the surface of a body of water. The lifting step may comprise activating at least one vertical thruster on the AUV and lifting a first end of the AUV off of the seabed solely by using the at least one vertical thruster. The positioning step may comprise changing a vertical position of the AUV by using the at least one horizontal thruster. In some embodiments, vertical travel in a body of water does not require the use of the vertical thruster. Instead, varying the speed of the AUV by the horizontal thruster controls the lift of the AUV by the buoyant body, thereby controlling the vertical position of the AUV.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Autonomous Underwater Vehicles and Components Thereof

In one or more embodiments, an autonomous underwater vehicle (AUV) is used to record seismic signals on or near the seabed. A seismic AUV in the following description is considered to encompass an autonomous self-propelled underwater node that has one or more sensors capable of detecting seismic waves in a marine environment. The following embodiments are discussed, for simplicity, with regard to the terminology and structure of an AUV with seismic sensors for recording seismic waves. In general, the structure and operation of a seismic AUV is well known to those of ordinary skill. For example, Applicant's U.S. Pat. No. 9,090,319, incorporated herein by reference, discloses one type of autonomous underwater vehicle for marine seismic surveys.

Figure 1:
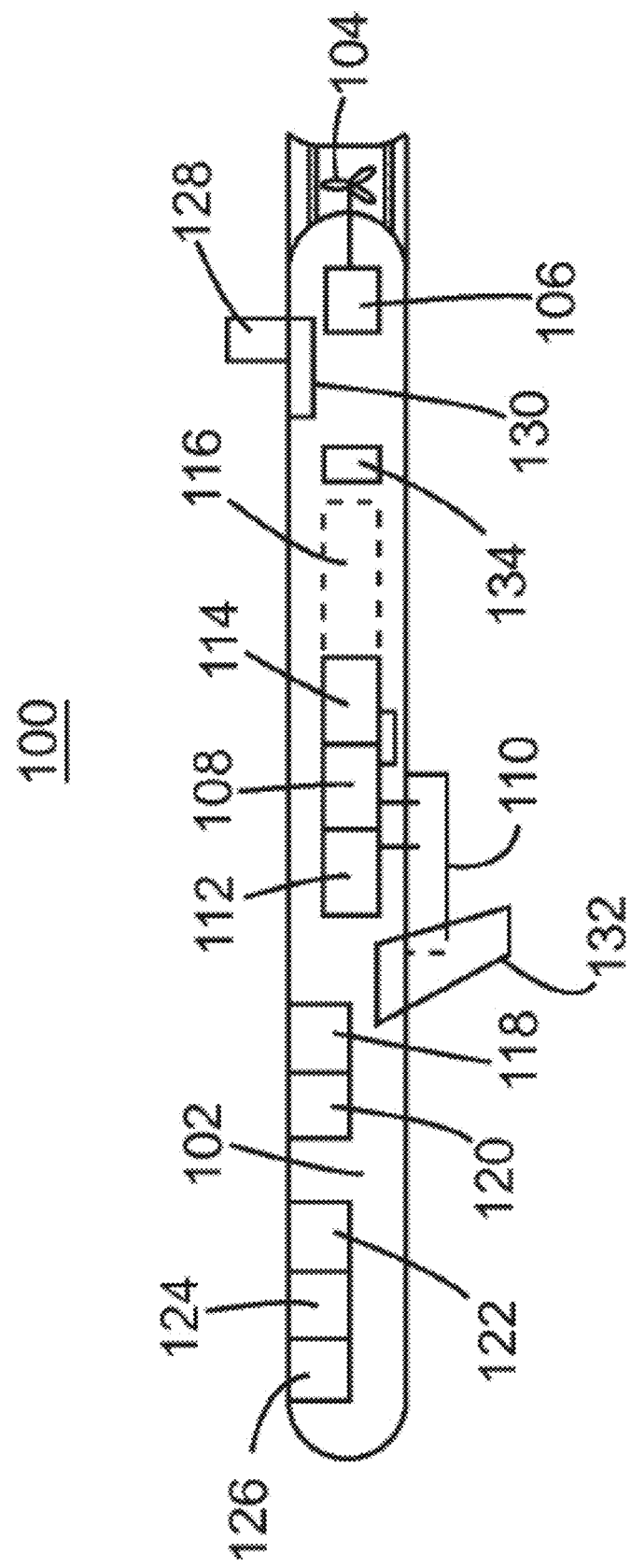
FIG. 1 illustrates one embodiment of a schematic diagram of an AUV.
Figure 5:
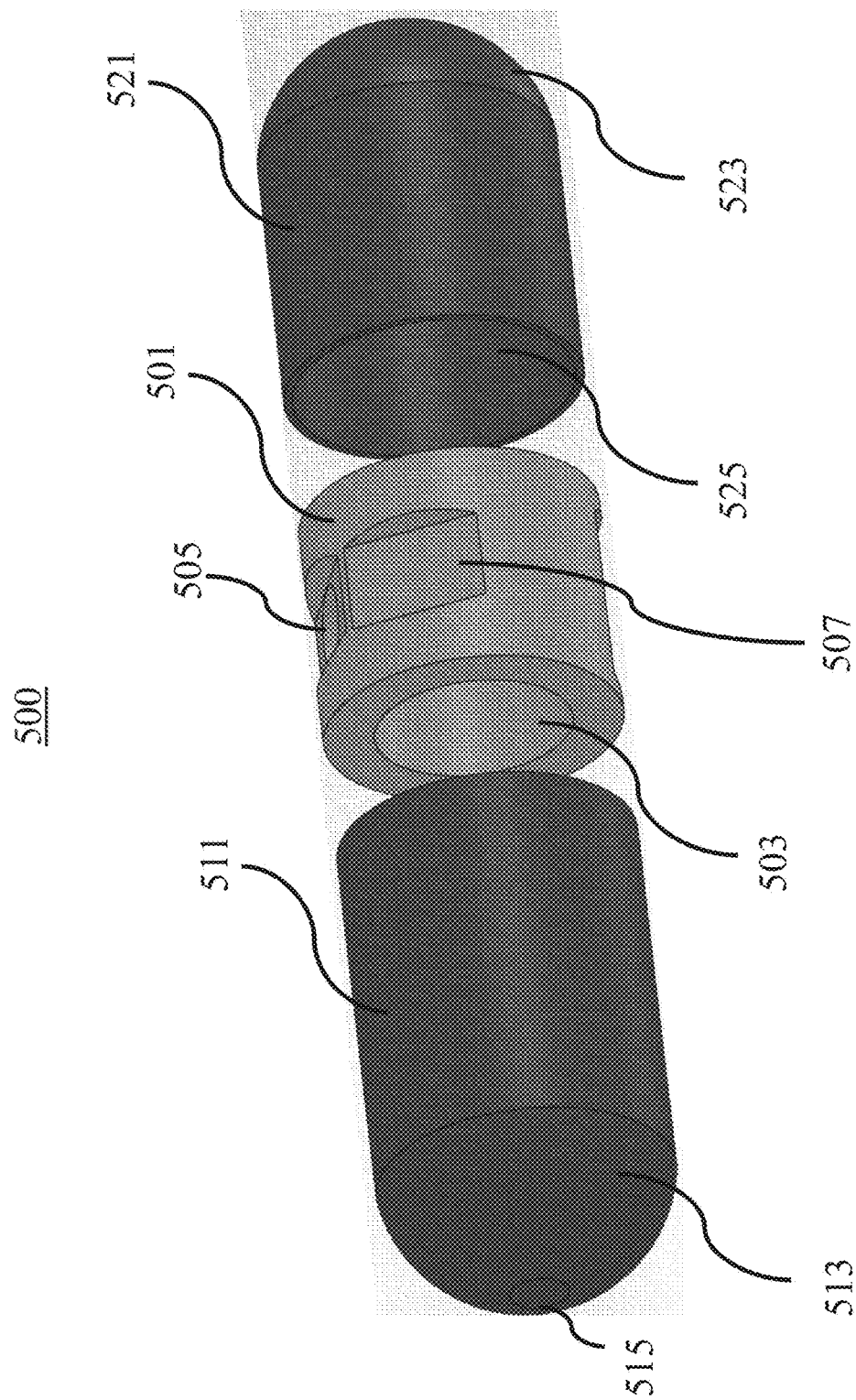
FIG. 5 illustrates one view of one embodiment of a pressure vessel of an AUV in an exploded view.

FIG. 1 is reproduced from FIG. 5 of Applicant's U.S. Pat. No. 9,090,319. The disclosed embodiment may use one or more systems, components, and/or features from the AUV described in FIG. 1. FIG. 1 illustrates one embodiment of AUV 100 having a body 102 in which a propulsion system may be located. The propulsion system may include one or more propellers 104 and a motor 106 for activating the propeller 104. Other propulsion systems may be used, such as jets, thrusters, pumps, etc. Alternatively, the propulsion system may include adjustable wings for controlling a trajectory of the AUV. Motor 106 may be controlled by a processor/controller 108. Processor 108 may also be connected to a seismic sensor 110. Seismic sensor 110 may have a shape such that when the AUV lands on the seabed, the seismic sensor achieves a good coupling with the seabed sediment. The seismic sensor may include one or more of a hydrophone, geophone, accelerometer, etc. For example, if a 4C (four component) survey is desired, seismic sensor 110 may includes three accelerometers and a hydrophone, i.e., a total of four sensors. Alternatively, the seismic sensor may include three geophones and a hydrophone. Of course, other sensor combinations are possible, and may include one or more of a hydrophone, geophone, accelerometer, electromagnetic sensor, depth sensor, MEMs, or a combination thereof. Seismic sensor 110 may be located completely or partially inside body 102. A memory unit 112 may be connected to processor 108 and/or seismic sensor 110 for storing seismic data recorded by seismic sensor 110. A battery 114 may be used to power all these components. Battery 114 may be allowed to shift its position along a track 116 to change the AUV's center of gravity. This shift may be controlled by processor 108.

The AUV may also include an inertial navigation system (INS) 118 configured to guide the AUV to a desired location. An inertial navigation system may include a module containing accelerometers, gyroscopes, magnetometers, or other motion-sensing devices. The INS may initially be provided with the current position and velocity of the AUV from another source, for example, a human operator, a GPS satellite receiver, a deployed subsea station, a deployed ROV, another AUV, from the vessel, etc., and thereafter, the INS computes its own updated position and velocity by integrating (and optionally filtrating) information received from its motion sensors. One advantage of an INS is that it requires no external references in order to determine its position, orientation or velocity once it has been initialized. However, the INS may still require regular or periodic updates from an external reference to update the AUV's position to decrease the positioning error of the AUV, particularly after long periods of time subsea. As noted above, alternative systems may be used, as, for example, acoustic positioning. An optional acoustic Doppler Velocity Log (DVL) (not shown) can also be employed as part of the AUV, which provides bottom-tracking capabilities for the AUV. Sound waves bouncing off the seabed can be used to determine the velocity vector of the AUV, and combined with a position fix, compass heading, and data from various sensors on the AUV, the position of the AUV can be determined. This assists in the navigation of the AUV, provides confirmation of its position relative to the seabed, and increases the accuracy of the AUV position in the body of water.

Besides or instead of INS 118, the AUV may include compass 120 and other sensors 122 as, for example, an altimeter for measuring its altitude, a pressure gauge, an interrogator module, etc. The AUV 100 may optionally include an obstacle avoidance system 124 and a communication device 126 (e.g., Wi-Fi or other wireless interface, such as a device that uses an acoustic link) or other data transfer device capable of wirelessly transferring seismic data and/or control status data. One or more of these elements may be linked to processor 108. The AUV further includes antenna 128 (which may be flush with or protrude from the AUV's body) and corresponding acoustic system 130 for subsea communications, such as communicating with a deployed ROV (or other underwater station), another AUV, or a surface vessel or station. For surface communications (e.g., while the AUV is on a ship), one or more of antenna 128 and communication device 126 may be used to transfer data to and from the AUV. Stabilizing fins and/or wings 132 for guiding the AUV to the desired position may be used with propulsion system for steering the AUV. However, in one embodiment, the AUV has no fins or wings. The AUV may include buoyancy system 134 for controlling the AUV's depth and keeping the AUV steady after landing.

Acoustic system 130 may be an Ultra-Short Baseline (USBL) system, also sometimes known as Super Short Base Line (SSBL). This system uses a method of underwater acoustic positioning. A complete USBL system includes a transceiver or acoustic positioning system mounted on a pole under a vessel or ROV (such as Hi-PAP or μPAP, commercially available by Kongsberg) and a transponder on the AUV. In general, a hydro-acoustic positioning system consists of both a transmitter and a receiver, and any Hi-PAP or μPAP or transponder system acts as both a transmitter and a receiver. An acoustic positioning system uses any combination of communications principles for measurements and calculations, such as SSBL. In one embodiment, the acoustic positioning system transceiver comprises a spherical transducer with hundreds of individual transducer elements. A signal (pulse) is sent from the transducer (such as a Hi-PAP or μPAP head on the surface vessel), and is aimed towards the seabed transponder located on the AUV. This pulse activates the transponder on the AUV, which responds to the vessel transducer after a short time delay. The transducer detects this return pulse and, with corresponding electronics, calculates an accurate position of the transponder (AUV) relative to the vessel based on the ranges and bearing measured by the transceiver. In one embodiment, to calculate a subsea position, the USBL system measures the horizontal and vertical angles together with the range to the transponder (located in the AUV) to calculate a 3D position projection of the AUV relative to a separate station, cage, ROV, or vessel. An error in the angle measurement causes the position error to be a function of the range to the transponder, so an USBL system has an accuracy error increasing with the range. Alternatively, a Short Base Line (SBL) system, an inverted short baseline (iSBL) system, or an inverted USBL (iUSBL) system may be used, the technology of which is known in the art. For example, in an iUSBL system, the transceiver is mounted on or inside the AUV while the transponder/responder is mounted on a separate vessel/station and the AUV has knowledge of its individual position rather than relying on such position from a surface vessel (as is the case in a typical USBL system). In another embodiment, a long baseline (LBL) acoustic positioning system may be used. In a LBL system, reference beacons or transponders are mounted on the seabed around a perimeter of a work site as reference points for navigation. The LBL system may use an USBL system to obtain precise locations of these seabed reference points. Thus, in one embodiment, the reference beacon may comprise both an USBL transponder and a LBL transceiver. The LBL system results in very high positioning accuracy and position stability that is independent of water depth, and each AUV can have its position further determined by the LBL system. The acoustic positioning system may also use an acoustic protocol that utilizes wideband Direct Sequence Spread Spectrum (DSSS) signals, which provides for a greater communications range in the water.

With regard to the AUV's internal configuration, the AUV includes a CPU that is connected to an inertial navigation system (INS) (or compass or altitude sensor and acoustic transmitter for receiving acoustic guidance from the mother vessel), a wireless interface, a pressure gauge, and an acoustic transponder. The INS is advantageous when the AUV's trajectory has been changed, for example, because of an encounter with an unexpected object (e.g., fish, debris, etc.), because the INS is capable of taking the AUV to the desired final position as it encounters currents, wave motion, etc. Also, the INS may have high precision. For example, an INS may be accurate up to 0.1% of the travelled distance, and a USBL system may be accurate up to 0.06% of the slant range. Thus, it is expected that for a target having a depth of 1000 m, the INS and/or the acoustic guidance is capable of steering the AUV within +/−1 m of the desired target location. The INS may be also configured to receive data from a surface vessel and/or a deployed ROV to increase its accuracy. The AUV may include multiple CPUs. For example, a second CPU may be configured to control one or more attitude actuators and a propulsion system. One or more batteries may be located in the AUV. A seismic payload is located inside the AUV for recording the seismic signals. As another embodiment, an obstacle avoidance system may be included in the AUV, which is generally configured to detect an object in the path of the AUV and divert the AUV from its original route to avoid contact with the object. In one example, the obstacle avoidance system includes a forward-looking sonar. The AUV includes any necessary control circuitry and software for associated components. In one embodiment, the AUV may have various operational modes, such as wakeup, sleep, maintenance, and travel modes.

Those skilled in the art would appreciate that more or less modules may be added to or removed from the AUV. For example, the AUV may include variable buoyancy functionality, such as the ability to release a degradable weight on the bottom of the ocean after seismic recording to assist in the rise or surfacing of the AUV to a recovery spot (such as on or near the ocean surface). In other embodiments, the AUV may include one or more buoyancy or ballast tanks that may be flooded with air or water to assist in the vertical navigation of the AUV, such as described in more detail in Applicant's U.S. Patent Publication No. 2015/0336645, incorporated herein by reference. In another embodiment, the AUV may include a suction skirt that allows water to be pumped out of a compartment under the AUV after it has landed to create a suction effect towards the seabed. In still other embodiments, the AUV may include one or more seabed coupling mechanisms or self-burying functionality, such as the ability to rock or twist into the ocean by specific movements of the AUV or the use of a plurality of base water outlets on the bottom of the AUV to fluidize the seabed sediment, as described in more detail in Applicant's U.S. Pat. Nos. 9,381,986 and 9,457,879, incorporated herein by reference.

Improved Autonomous Underwater Vehicle

The disclosed AUV embodiments provides numerous benefits over previously disclosed seismic AUVs, including better seabed seismic coupling, enhanced subsea maneuverability, control, and propulsion, and increased acoustic capabilities. The disclosed AUV uses less power than conventional seismic AUVs, and is also more cost effective, lighter, less complex more reliable, and easier to handle and repair than existing seismic AUVs.

Figure 2A:
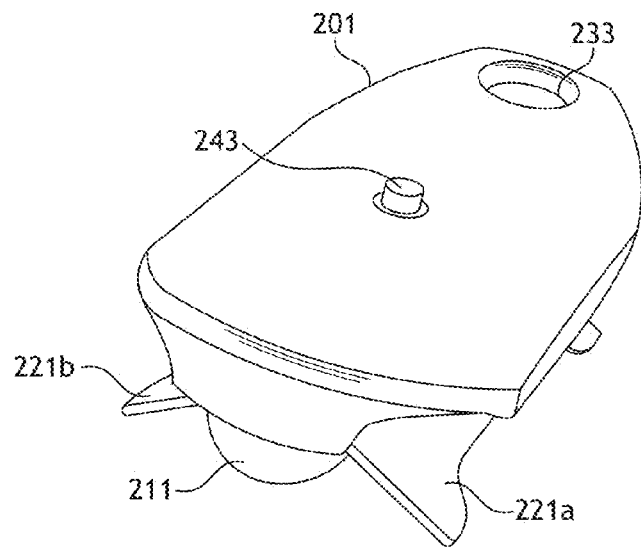
FIGS. 2A-2C illustrate various views of an AUV according to one embodiment of the present disclosure.
Figure 2B:
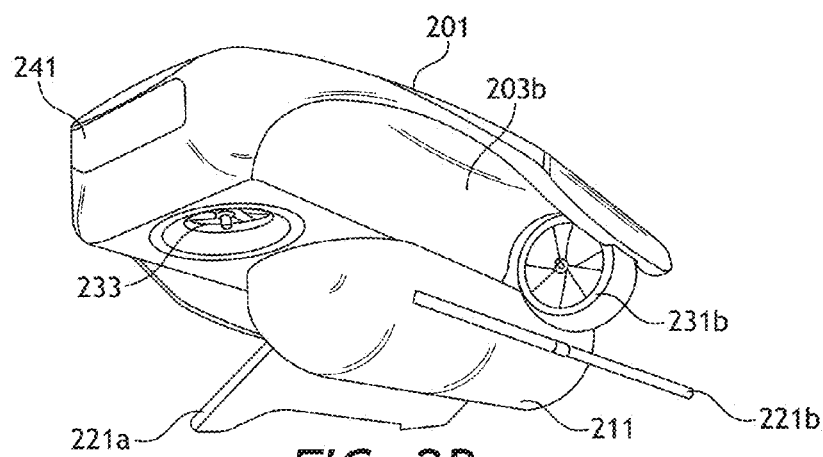
Figure 2C:
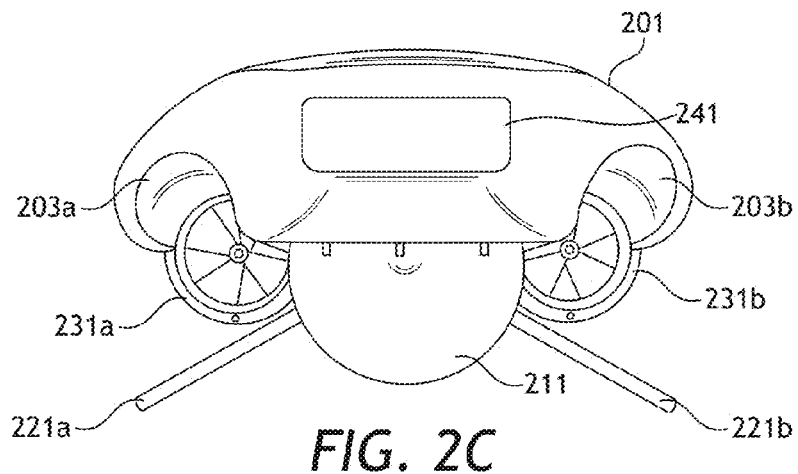

FIGS. 2A-2C illustrate various views of an AUV according to one embodiment of the present disclosure. FIG. 2A illustrates a rear perspective view, FIG. 2B illustrates a front perspective view, and FIG. 2C illustrates a front view. As shown in FIGS. 2A-2C, the disclosed AUV comprises buoyant body 201 coupled to pressure vessel or housing 211 that is connected to one or more landing fins 221a, 221b. Pressure vessel 211 may incorporate all or substantially all of the electronics and batteries of the AUV. In some embodiments, some of the AUV electronic components (such as transducer 243 or homing beacon/guide 241 or thrusters 231a, 231b) may be located exterior to the pressure housing and be coupled to the electronics within the pressure housing via one or more direct or indirect connectors. Landing fins 221a, 221b may be configured to help couple the AUV to the seabed, and may be attached to pressure vessel 211 (as shown in FIG. 2B) or to body 201. In one embodiment, each fin 221a, 221b protrudes substantially perpendicular to the surface of the pressure vessel such that the two fins may be between 30 degrees and 180 degrees apart, or more particularly between 60 degrees and 120 degrees apart. Fins 221a, 221b also assist in movement of the AUV in a body of water. The AUV comprises a propulsion system configured to propel and/or steer the AUV in a body of water. In one embodiment, the propulsion system may comprise one or more thrusters, such as one or more vertical thrusters 233 and one or more horizontal thrusters 231a, 231b. The AUV may also comprise a guidance system configured to guide the AUV to a particular location/destination in a body of water and/or a navigation system configured to determine the position of the AUV within a body of water. In one embodiment, the guidance system may comprise and/or be coupled to transducer 243, which may be located on an exterior portion of the body 201 or pressure vessel 211. In one embodiment, transducer 243 is fastened to an exterior portion of pressure vessel 211 but protrudes through an opening in body 201. The AUV may be configured to travel to at least 3000 meters beneath the surface of a body of water and record seismic signals at the bottom of the seabed with one or more seismic sensors (not shown).

In one embodiment, body 201 is comprised of a positively buoyant flotation material that partially offsets the remaining negative buoyant components of the AUV, thereby making the overall buoyancy of the AUV slightly negative. In other words, while the AUV main body is positively buoyant, the remaining components (e.g., the pressure vessel, landing fins and other attached components) are negatively buoyant such that the overall buoyancy is slightly negative. The flotation material may be made of a material with a plurality of air cells or pockets. In one embodiment, the floatation material is made out of microsphere syntactic foam, which is comprised of resin and hollow glass microspheres. The syntactic foam is available in a range of densities and is formulated to meet depth and buoyancy requirements down to 10,000 meters. The syntactic foam may be fully casted and/or machined to the specific configurations of the AUV body shape and thereafter coated with one or more layers of protective skins for improved impact resistance, reduced water absorption, and reduced drag in the water. The protective coating may also have anti-fouling properties to prevent or slow down any undesired marine biological growth. In other embodiments, the floatation material may also be casted in a pre-made polyethylene (PE) coated or similar plastic coating rotation mold. In one embodiment, the buoyant body of the AUV is cast as a single foam structure, such that the main body and the contoured wings form a monolithic and/or single structure. In other embodiments, the foam body may comprise separate portions that are integrated together, such that the buoyant main body may be removably attached to one or more buoyant wing sections. The configuration and design of the buoyant wings creates increased lift, such that only horizontal thrust is needed during normal AUV flight within a body of water. In other words, once the AUV lifts off the seabed or other resting place and has reached its cruising speed, the lift created from the wing shape of the foam is great enough to balance out the negative buoyancy of the vehicle. Thus, during normal flight operations, the vertical thruster is used only for depth control and to maintain level flight. While this design may increase the overall complexity of the AUV shape, it decreases the overall power needed to move the AUV in a body of water and the number of thrusters required, thereby decreasing the size (and weight), complexity, and cost of the necessary power supply, and thereby decreases the overall cost of the AUV. Various embodiments of buoyant body 201 are possible, as described below in more detail in relation to FIGS. 4A-4C.

In one embodiment, pressure vessel 211 holds substantially all of the electronic components of the AUV, including any seismic sensors, batteries, processors, data recording units, memory units, motors, etc. In one embodiment, the hydrophone is mounted directly into an exterior portion of the pressure vessel for exposure of the hydrophone to the water. In one embodiment, the hydrophone is casted or glued to the inside of the pressure vessel hull or to the titanium center hub (see FIGS. 5 and 6). Any combination of seismic sensors is possible. In one embodiment, if a 4-component (4C) survey is desired, the seismic sensors may comprise a hydrophone and three or more particle velocity sensors (e.g., geophones, accelerometers, etc.). In one embodiment, the geophones are mounted in a rigid mechanical structure within the pressure vessel to mechanically couple the geophones to the pressure vessel (which is mechanically coupled to the landing fins) to obtain good fidelity of the seismic signals.

One problem with conventional seismic AUVs and sensors is the use of external cables, wires, and/or connectors outside of any pressurized vessel. Each electrical component (e.g., motor, sensor, battery, antenna, propeller, etc.) requires an electrical connection. Harsh conditions (such as extreme pressures and temperatures existing at or near the seabed, along with corrosion issues caused by seawater) cause many problems with electrical connections and components exposed to the sea, often times leading them to fail and/or have a shortened life. While it is desired to reduce the number of electrical components and connections outside of a single pressure vessel, existing designs of seismic AUVs have not been able to solve this problem. Thus, in one embodiment, the disclosed AUV eliminates all or substantially all of the electrical cables and connectors outside of the pressure vessel by using a central electrical hub (see FIGS. 5 and 6) that may connect each piece of external equipment to pressure vessel 211.

In one embodiment, pressure vessel 211 is substantially cylindrical and may be comprised of a single cylindrical housing with two hemispherical endcaps, such that when integrated together the pressure vessel is capable of withstanding pressure depths of 3000 meters or more beneath the water surface. In contrast to prior art AUV designs, this cylindrical design provides a cost effective configuration for the pressure housing; however, such a uniform shape to the pressure vessel creates additional problems, such as electrically connecting many of the operational components that are needed for an AUV (such as propellers, sensors, acoustic devices, etc.). In one embodiment, the pressure vessel may be coupled to the lower side of the buoyant body, as shown in FIG. 2B. The pressure vessel may be located on the bottom of the buoyant body (such as that shown in FIG. 3A) or may fit within a contoured opening, recess, or pocket of the AUV, such as that shown in FIG. 2B. Pressure vessel 211 may be made of carbon fiber, titanium, aluminum or other material. As one example, using a composite material such as carbon fiber as the primary material in the pressure vessel decreases the overall weight of the AUV; thus, the size of the buoyancy material can be reduced to maintain the same desired buoyancy in the water. This decreased weight (based on a less dense material) is beneficial to reduce the overall size, weight, and cost of the AUV. Another advantage of a carbon fiber pressure vessel is that acoustic signals will penetrate the wall of the carbon fiber tube, which may allow an altimeter to be placed inside of the pressure vessel in contact with a portion (such as the bottom) of the pressure vessel. In some embodiments, a first portion of the pressure vessel is made of a first material (such as carbon fiber) and a second portion of the pressure vessel is made of a second material (such as titanium or anodized aluminum). The first material may be less dense than the second material to reduce the overall weight of the AUV. In another embodiment, the pressure vessel semispherical endcaps may comprise a first material and a hub connector ring may couple the two endcaps and comprise a second material. In one embodiment the endcaps are partially or substantially non-metallic and the hub connector ring is substantially metallic.

In one embodiment, the AUV comprises a plurality of landing skids and/or fins. Skids and/or fins may protrude from the pressure vessel and/or be coupled to the pressure vessel, and may be any variety of material compositions, including plastic and/or metal. In one embodiment, a first fin is arranged at approximately 90 degrees from a second fin. The fins may be arranged in numerous configurations, including from approximately 30 degrees or less to approximately 180 degrees in relation to each other, and preferably between 60 degrees to 120 degrees. The fins provide stabilization to the AUV during movement of the AUV in the water and while resting on the seabed floor, and thereby also function as stands. The landing fins also produce lift when the AUV is moving forward with at least a minimal upwards attack angle. Further, the fins provide increased contact to the seabed and provide increased seabed coupling for the seismic sensors. In one embodiment, each fin comprises two protrusions or ends at the corners for increased penetration into and coupling with the seabed, such that the AUV is configured to couple to the seabed at four separate points (two points on each landing fin). This stabilizes the vehicle on the bottom, especially in uneven bottom surface. In one embodiment, the landing fins and pressure vessel are arranged such that in soft seabed situations the pressure vessel is configured to slightly sink into the seabed sediment for increased seabed coupling to the AUV sensors. In these cases the bottom of the pressure vessel may be resting on the seabed.

In one embodiment, the propulsion system of the AUV may comprise a plurality of thrusters, and in one embodiment may include one vertical thruster 233 located in a front portion of the AUV and two horizontal thrusters 231a, 231b located substantially in the middle portion of the AUV near the center of buoyancy (COB). In some embodiments, the horizontal thrusters are located substantially in the rear portion of the body as viewed longitudinally. In one embodiment, each horizontal thruster is located in a circular opening or recess 203a, 203b underneath the contoured wings of body 201. The efficient design of the AUV, as well as the center of buoyancy and center of gravity (COG), provides an inherent stability of the AUV in which a minimal number (such as three) thrusters is needed for stable flight within a body of water. In one embodiment, the AUV is configured to provide a high separation between the COB to the COG, as increasing the COB to COG distance will increase the stability of the AUV in a body of water thereby requiring a less complex control system.

The thrusters may be propellers, impellers, and/or jet nozzles. Each thruster may be coupled to a motor or water pump that is powered by a power supply. Each thruster may be selectively and independently operated and controlled, such that for any particular movement and/or operation, one, two, or three of the thrusters may be simultaneously operated. The thrusters are configured to rotate in opposing directions as appropriate. For example, vertical thruster 233 may rotate in a first direction to provide positive vertical lift (e.g., move the nose of the AUV up) and may be configured to rotate in a second direction to provide negative vertical lift (e.g., move the nose of the AUV down). Similarly horizontal thrusters 231a, 231b may be configured to rotate in a first direction to provide forward movement and in a second direction to provide backwards movement. Each of the horizontal thrusters may be configured to operate in counter-rotating propeller mode (e.g., rotate in separate directions and still provide the same lateral movement) for increased AUV flight stability, such that the angular momentum and/or torque developed by the propellers is balanced and/or cancelled out. In other embodiments, a plurality of vertical thrusters may be used, such that a first thruster is located substantially in the front section of the AUV and a second thruster is located substantially in the rear section of the AUV. In still other embodiments, each buoyant wing of the AUV may be coupled to a vertical thruster, such that the AUV has four vertical thrusters (one at the front, one at the back, and one on each wing). In one embodiment, vertical thruster 233 is mounted in an opening in the buoyant body, and each horizontal thruster 231a, 231b is mounted under a rear portion of a wing.

In still other embodiments, each thruster is configurable between a first position to provide substantially lateral movement and a second position to provide substantially vertical movement, such that each thruster may act as both a vertical and horizontal thruster depending on the angle/configuration of the thruster. In one embodiment, the thrusters are any commercially available thrusters configured to create a certain amount of thrust in a given direction in a body of water. In other embodiments, the thrusters are specially designed thrusters for optimal weight, design, and speed, size, and thrust considerations. In one embodiment the thruster uses a two-blade propeller, but in other embodiments, three, four or more bladed propellers may be used. In one embodiment the motor driving the thruster is a direct drive DC brushless motors for low noise in noise sensitive applications. In one embodiment the AUV uses rim driven thrusters. Rim driven thrusters significantly prevent the risk of a rope, cable, or similar deployment line from being trapped in the propeller of the thruster. In a rim driven thruster, the center of the propeller is "open" with the propellers or fins being rotated by the rim or outer periphery of thruster driving the propellers, such that a rope can pass through without catching.

Vertical thruster 233 creates a force either upwards or downwards depending on its rotation direction. In one embodiment, vertical thrust is not utilized to significantly move the AUV vertically in a body of water, but can be used for depth control and/or to maintain level flight. In other words, vertical thruster 233 is not used during normal flight mode of the AUV in a body of water. However, vertical thruster 233 is used during take off from and landing on the seabed (as more easily described in relation to FIGS. 7A-7E). It is also used when the speed through water is not sufficient to create the necessary lift if the vehicle to keep level flight. In one embodiment, vertical thruster 233 is configured to increase the coupling of the AUV to the seabed. For example, as the AUV approaches the seabed, vertical thruster 233 may be operated to create a downward force such that the AUV is planted deeper into the seabed than otherwise possible without the suction. In other embodiments, vertical thruster 233 is used to liquefy the bottom of the seabed where there is sediment on the seabed. As another example, vertical thruster 233 may be used during take-off to push water downwards to liquefy sediments and/or bottom composites on the seabed to reduce and overcome any suction effect. At the same time, the downward push of water will create an upwards force, also helping to release the AUV from the bottom. Thus, when taking off from the seabed, and if necessary to overcome bottom suction or otherwise escape entanglement on the seafloor, maximum vertical thrust may be used to create an upwards angle of the AUV before horizontal thrusters are engaged for takeoff from the seabed.

In one embodiment, the AUV is specifically designed to be heavier in seawater to allow prolonged deployment on the seabed. In other words, the AUV is not neutrally buoyant in a body of water, and to compensate for this negative weight, the AUV is configured with a vertical thruster located near the nose of the AUV (such as vertical thruster 233) and a form lift is created by the AUV body as it travels through the water at a cruising speed under power from the horizontal thrusters (such as horizontal thrusters 231a, 231b). Thus, the form lift shape (such as body 201 or body 301) allows a permanently negatively buoyant AUV in a water column to be suspended during horizontal transit without additional vertical thrusters/power. If horizontal speed is decreased, the upwards lift decreases and the negatively buoyant AUV sinks; if horizontal speed is increased, the upwards lift increases to overcome the negative buoyancy and the AUV rises. To maintain level flight, the AUV control algorithm may slightly change the vehicle pitch angle. This is in contrast to existing AUV devices, which typically have some type of buoyancy change device (water expulsion, inflatable bag, weight release, etc.) to alter the buoyancy of the AUV to move it from one position to another position (such as from the water surface to the seabed).

Figure 3A:
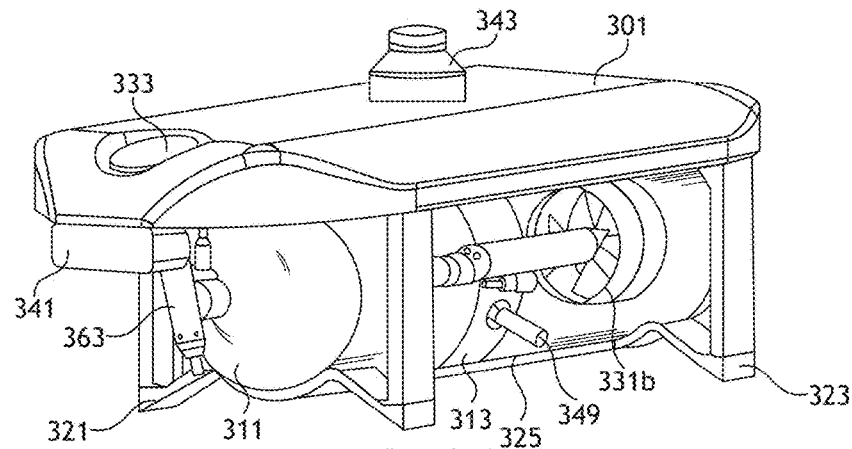
FIGS. 3A-3C illustrate various views of an AUV according to one embodiment of the present disclosure.
Figure 3B:
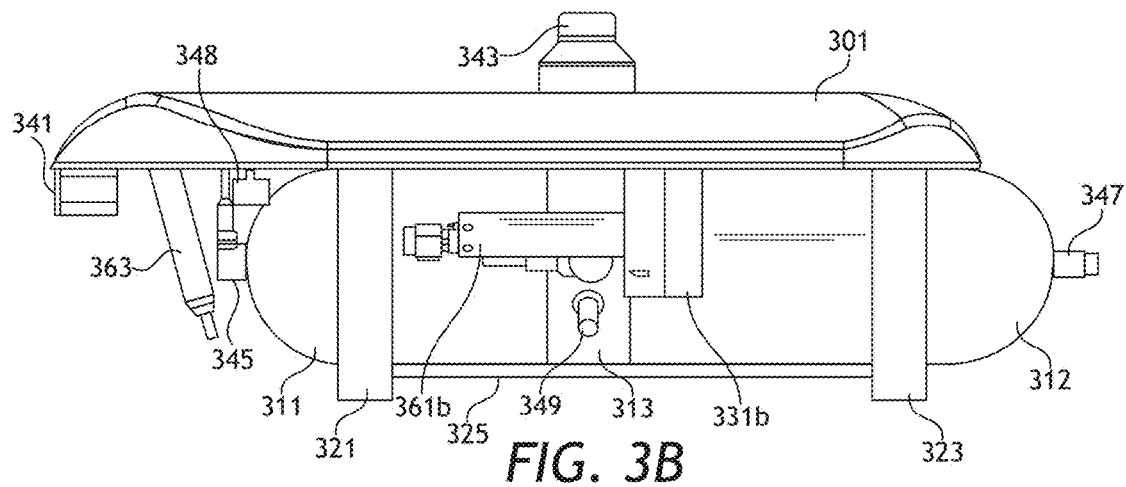
Figure 3C:
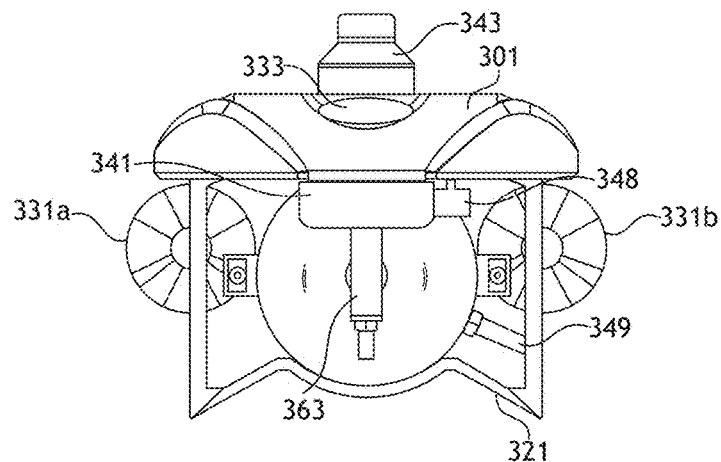

FIGS. 3A-3C illustrate various views of an AUV according to another embodiment of the present disclosure. FIG. 3A illustrates a front perspective view, FIG. 3B illustrates a side view, and FIG. 3C illustrates a front view. The seismic AUV and components thereof described in FIGS. 3A-3C is substantially similar to that described in FIGS. 2A-2C. For example, the disclosed AUV comprises buoyant body 301 coupled to a pressure vessel with a first forward part 311 (such as one half of a tube) and second rear part 313 (such as one half of a tube) that is connected to one or more landing fins or landing frames 321, 323. The pressure vessel may incorporate all or substantially all of the electronics (such as the Digital Autonomous Recorder (DAR) and memory) and batteries of the AUV. The AUV may comprise three thrusters, with one vertical thruster 333 located in a substantially front portion of body 301 and two horizontal thrusters 331a, 331b mounted on either side of the pressure vessel. The pressure vessel may have a first part or portion 311 and a second part or portion 312, each with an end in the general shape of a hemisphere, and coupled by a metallic ring connector 313 that may acts as a stiffening ring or connector for the pressure vessel. The hemispherical ends may be metallic or non-metallic, and may be a different material than the rest of pressure vessel first portion 311 and second portion 312. The first hemisphere end may have a first connector 347 located substantially in the middle of the end configured for data transfer (e.g., Ethernet port) and/or power charging, and the second hemisphere end may have a second connector 345 located substantially in the middle of the end configured for powering and/or electrical communications with the vertical thruster.

This alternative embodiment shown in FIGS. 3A-3C show that the landing fins may be connected by a substantially straight stabilizing bar 325. Thus, front landing frame 321 and rear landing frame 323 may be coupled via frame stabilizer 325, all of which may be considered as a frame assembly surrounding the pressure vessel instead of isolated landing fins as shown in FIGS. 2A-2C. In one embodiment, a landing frame assembly (e.g., legs 321, 323 and stabilizing bar 325) fastens and/or couples the pressure vessel to the buoyant body. The landing frame assembly acts as a stand while the AUV is on the seabed, on a subsea device (e.g., cage, basket, skid, ROV), or on the back deck of a marine vessel. The frame assembly also acts to seismically couple the AUV to the seabed. The pressure vessel attaches beneath buoyant body 301 instead of being placed within a contoured portion of the buoyant body as in FIGS. 2A-2C. Further, buoyant body 301 is simplified as compared to buoyant body 201. For example, buoyant body 301 is in the approximate shape of a contoured half cylinder, such that an upper portion of the body is substantially in the shape of a hemisphere and the lower portion is substantially flat. While vertical thruster 333 resides in a front portion of the AUV (and more particularly within a cutout of buoyant body 301), horizontal thrusters 331a, 331b are placed near a middle section of the AUV. Each thruster may be coupled to a motor or similar device. For example, vertical thruster 333 (e.g., propeller and nozzle) may be coupled to motor 363, and horizontal thrusters 331a and 331b (e.g., propeller and nozzle) may be coupled to motors 361a and 361b, respectively. In one embodiment, the thrusters can be connected to the pressure vessel (and internal electronics thereof) by pressured sealed connectors or penetrators, while in another embodiment the thrusters are coupled in a cable-less manner by corresponding flat surface electrical connections on the thruster and pressure vessel. Each such flat surface connection may be sealed by an O-ring. In still other embodiments, the flat surface connection may comprise cables that pass between a hole/channel on the inside of the O-ring seal. Such connections can be used for other external electronic devices besides thrusters.

Shown in more detail in FIGS. 3A-3C are various components of the AUV attached to an exterior portion of the AUV. For example, acoustic device 343 (such as a transducer) is located on an upper section of body 301. In one embodiment, transducer 343 is mounted on top of the pressure vessel to titanium ring or hub 313 to eliminate cables and connectors. Transducer 343 may protrude out through an appropriately sized opening of the buoyant body of the AUV (such as opening 415b in FIG. 4C). The transducer is configured to acoustically communicate with another subsea device, whether it is another AUV, an ROV, a cage, a subsea station, or an acoustic system of a surface vessel. Based on communications with a separate device, the location of the AUV may be communicated to the AUV and/or determined by a navigation system of the AUV. In still other embodiments, navigation instructions are provided to the AUV by a separate subsea device, such that a navigation system is not necessarily needed on the AUV. In one embodiment, transducer 343 is a cNode transducer that is coupled to a Kongsberg Maritime μPAP or HIPAP or other similar acoustic communications system on a surface vessel. Such a system is configured to support a SSBL or other acoustic system. The transducer shape may be custom-designed to have the least drag coefficient possible to minimize vehicle drag through the water. This will in turn reduce the need for energy stored in the batteries. In one embodiment, hydrophone 349 is mounted on a side of the pressure vessel, such as on metallic ring 313.

Homing and docking array 341 is located on a front portion or nose of the AUV and is configured for automatic homing into a retrieval device or basket. For example, in one embodiment one or more transmitters may be located on a retrieval device or basket that transmits a tone or ping for the homing array to navigate towards. Homing array 341 may be made up of several sensors arranged in an array, and when it approaches the transmitter it can use this array to detect the transmitted signals and determine which direction the AUV needs to fly to reach the destination. The closer the AUV gets to the transmitter, the more accurate that the homing array will be able to navigate the AUV to the destination position. In one embodiment, the homing array is directly attached to the pressure vessel to eliminate external cables, while in other embodiments a cable is run from the pressure vessel to the homing array.

In one embodiment, altimeter 348 is mounted on the exterior hull of the pressure vessel, such as on the bottom or side of the pressure vessel. The altimeter measures the altitude of the vehicle over sea bottom, which is an important parameter in case of dead reckoning of the AUV. The altimeter may also assist in the landing process of the AUV, as it is an important sensor to determine the AUV's height over the seabed. In another embodiment, the altimeter may be mounted on the inside of the pressure vessel, which may be possible if the pressure vessel (or portions thereof) is made of carbon fiber or other composite material. Mounting the altimeter inside the pressure vessel tube provides many benefits, including reducing an electrical connection through the pressure vessel, which reduces the risk of failure in case of water ingress. An additional benefit is that it removes the need for the altimeter to have a full depth rating of 3000 meters (or other high depth water pressure typical on the ocean bottom), since the altimeter may now be mounted inside of the pressure tube. Thus, the resulting altimeter is less complex, less likely to fail, and is less expensive.

Figure 4A:
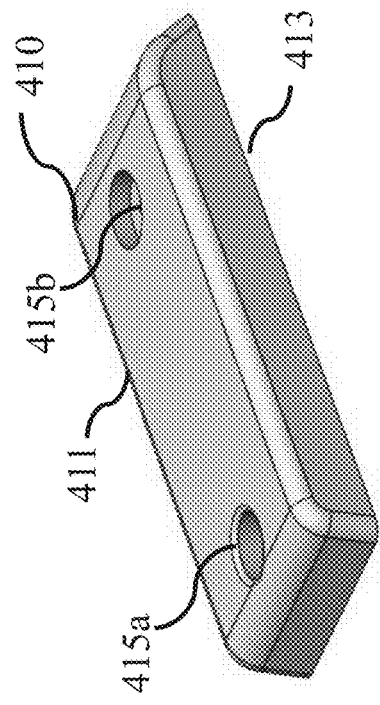
FIGS. 4A-4C illustrate various views of an AUV buoyant body according to various embodiments of the present disclosure.
Figure 4B:
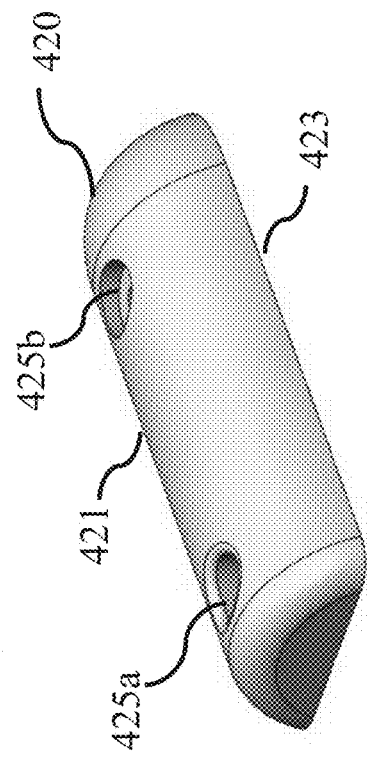
Figure 4C:
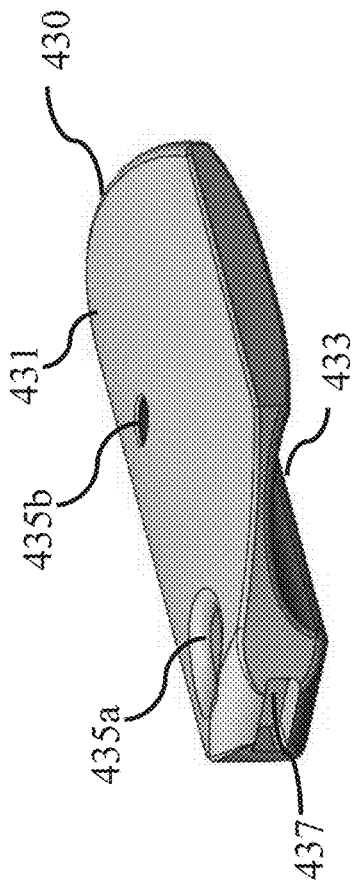

FIGS. 4A-4C illustrate various views of buoyant body 201 according to various embodiments of the present disclosure. The body may be positively buoyant and may comprise a floatation body or a flotation material. As shown in FIG. 4A, buoyant body 410 may have a substantially flat upper section 411 and a substantially flat lower section 413, each with or without rounded edges. This configuration provides enhanced conditions for an ROV suction device to connect to the top of the AUV. Further, a substantially flat design of the buoyant body is also easier and cheaper to machine than a more complex or contoured shape. As shown in FIG. 4B, buoyant body 420 may be in the approximate shape of a half cylinder, such that an upper portion of the body 421 is rounded in the shape of a hemisphere and the lower portion of the body 423 is substantially flat. In another embodiment, as shown in FIG. 4C, buoyant body 430 is substantially flat on top portion 431 with one or more contoured buoyant wings on the sides that are shaped downwards, such that lift is created during movement of the AUV in water, similar to lift created by an airplane during flight. The buoyant wings are attached to and/or form part of the main body, such that the body and wings are both comprised of the same flotation material. The buoyant wings extend out from a main portion of the buoyant body and arch over such that half of a hollow cylinder 433 is formed under each wing. The buoyant bodies may have one or more openings to receive an electronic component, such as openings 415b, 425b, 435b to receive an acoustic transponder or openings 415a, 425a, 435a to receive a vertical thruster. FIG. 4C shows an embodiment that comprises opening 437 located on a front portion of the buoyant body and configured to receive an acoustic beacon and/or homing device and/or other external device.

Figure 6:
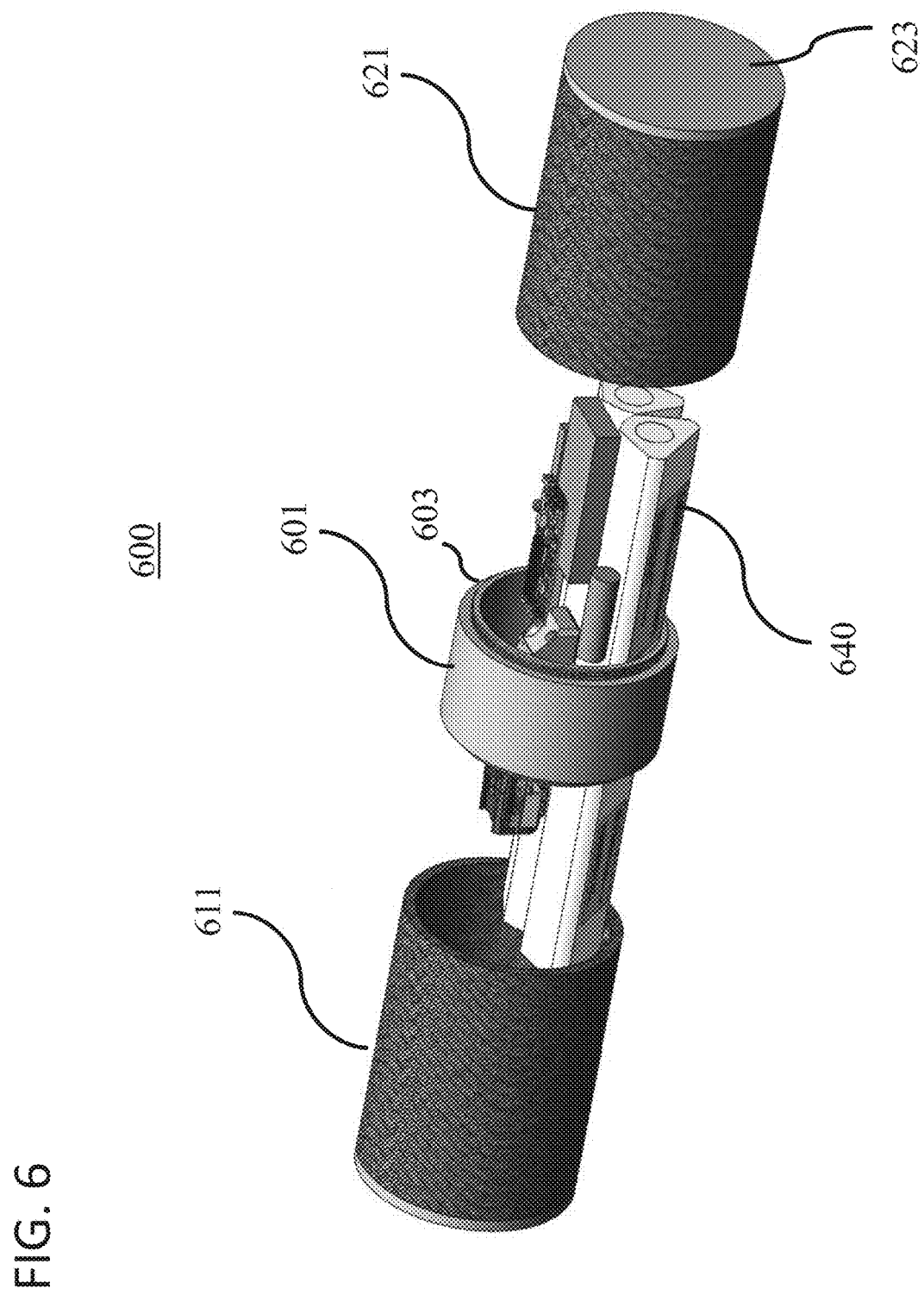
FIG. 6 illustrates one view of one embodiment of a pressure vessel of an AUV in an exploded view.

FIGS. 5 and 6 illustrate similar but alternative embodiments of a pressure vessel of the disclosed AUV in an exploded view. FIG. 5 illustrates pressure vessel 500, which may be substantially similar to the pressure vessels of FIGS. 2 and 3. In one embodiment, pressure vessel 500 comprises first end 511 and second end 521, coupled together by hub connector ring 501. Each of the ends may be substantially hollow, thereby forming a cavity 525 to hold portions of the AUV electronics. Similarly, hub connector ring 501 may comprise a cavity section 503 to hold portions of the AUV electronics. Ring 501 sits in the middle of the pressure vessel in such a way that it connects two pressure vessel halves or portions of the pressure vessel together, and may act as a stiffening ring for the pressure vessel. Each end may comprise a substantially hemispherical portion, such as first hemisphere 513 and second hemisphere 523. Each end may be comprise one or more holes or openings 515 to receive an electrical connector or penetrator for any electronics components of the AUV to be mounted exterior to pressure vessel 500. The ends 513, 523 may be different in material than first and second parts 511, 521. In other embodiments, the pressure vessel may comprise a plurality of rings 501 that connects different components of the pressure vessel together. In one embodiment, pressure vessel 500 comprises one or more exterior sections or components that form the housing of the pressure vessel to be made of carbon fiber. In one embodiment, each first and second end 511, 521 comprises a substantially carbon fiber material, and connector 501 comprises a metallic (such as titanium) ring or tube. Metallic ring 501 may be integrated with the carbon fiber end caps tubes 511, 521 in a way to provide structural support for the pressure vessel and/or make it more rigid and/or stiff. In one embodiment, carbon fiber tube halves 511, 521 comprise titanium flanges (not shown) glued or casted onto the carbon fiber tubes for increased coupling/fastening to the metallic ring 501. The titanium flanges may act as an O-ring or other sealing surface and mount on ring 501 with a dual O-ring seal that seals against the external sea water. In some embodiments, ring 501 may also be used as a central hub for electrical connections, thereby eliminating the need for electrical cables to any external components. Thus, in one embodiment, external components of the pressure vessel (such as connectors, thrusters, transducers, etc.) may be configured to mate with a titanium flange or ring portion 501 of pressure vessel 500. In one embodiment, an external device may be connected directly to O-ring flanges on the titanium hub 501 thereby providing a cableless penetrator solution.

Various penetrators may be machined into ring connector 501 for external connections to the pressure vessel, thereby eliminating the need for external cables. For example, ring 501 may comprise one or more openings 505 to receive an external electronic device such as an acoustic transducer. Any connectors/penetrators that couple to the pressure vessel may have O-ring seals that prevent the surrounding seawater to enter into the pressure vessel. For example, in one embodiment, two horizontal thrusters (such as thrusters 231a, 231b) are configured to mount onto pressure vessel 500 such that no external cables connect the pressure vessel to the thrusters. In this embodiment, the connection between the horizontal thrusters and the pressure vessel may be made by a penetrator in the titanium ring. Likewise, in some embodiments, the vertical thruster (such a thruster 233) is configured to also mount directly to the pressure vessel to avoid external cables, while in other embodiments a cable connects the vertical thruster to the pressure vessel (similar to the embodiment in FIGS. 3A-3C). Other components may similarly be connected directly to the pressure vessel through a penetrator in the titanium ring, such as a transponder, a connector, a PRV (pressure relive valve), a DVL (Doppler Velocity Log), an altimeter, a hydrophone, etc. As is standard in the art, the pressure vessel may also be configured with an external data connection port, such that data may be exchanged with the AUV and the batteries within the AUV recharged by physical connection of a wire/plug to the AUV. The connector may be placed in any position of the pressure vessel, such as on one or more ends or sides of the pressure vessel, or even on the center/pole end of the carbon fiber tube. In other embodiments, such power and/or data transfer is performed wirelessly. Ring 501 may also comprise one or more substantially flat sections 507 configured to make a flat surface for the different components, connectors, or penetrators to mount directly to the pressure vessel.

As described earlier, FIG. 6 is substantially similar to FIG. 5. Both embodiments include an electric hub (such as titanium ring 601) that sits in the middle of pressure vessel 600 in such a way that it connects two pressure vessel portions or halves 611, 621 together. Further, FIG. 6 shows a metallic lid or end cap 623 that is permanently bounded to the carbon fiber cylinders at each end, which may be flat (shown) or substantially hemispherical (not shown) for increased pressure resistance and reduced drag. Ring connector 601 comprises one or more grooves 603 that are configured to receive pressure vessel components 611, 621 on opposite sides of the ring. Similar to FIG. 5, pressure vessel 600 has one or more internal cavities and/or compartments to house and protect an electronics and battery package 640 within pressure vessel 600. Various configurations of the electronics and battery package 640 within the pressure vessel are possible, as easily illustrated in FIG. 6. Portions of electronics and battery package 640 may reside partially or substantially within first end 611, second end 621, and/or ring connector 601.

In one embodiment, the geophones may be located substantially in the center of the pressure vessel such that they are located in the approximate center of gravity (COG) of the AUV. Having the location of the geophones in the center of the AUV increases the quality of the of seismic data obtained by the geophones by having consistent readings and positions of the geophones in the AUV no matter the landing position/orientation of the AUV on the seabed. Also, the effect of any rotation of the AUV around its COG will have as low as possible impact on the fidelity of the geophone signals when the geophone array is mounted close to COG. In one embodiment, the configuration of the components changes the COG and/or center of buoyancy (COB) for the AUV. For example, the batteries may be placed at an upper portion of the pressure vessel for a center of gravity closer to the center of the AUV, whereas the batteries may be placed at the bottom of the pressure vessel if a lower center of gravity is desired to maximize overall AUV stability and to maximize COG and COB separation. The COB and COG of the AUV may be varied based upon the coupling of the pressure vessel to the buoyant body, as well as the location of electronic components within the pressure vessel itself. In one embodiment, the greater the distance between the COG and the COB, the more stable the AUV will be during flight, thereby reducing the complexity of the control algorithm for AUV flight. In other embodiments, the AUV may also have variable buoyancy so that the AUV changes it buoyancy when it has landed to make the AUV heavier for better coupling. Then before take off, the AUV may make the buoyancy lighter for easier lift off and because it is lighter, power is saved.

Operation

Figure 7A:
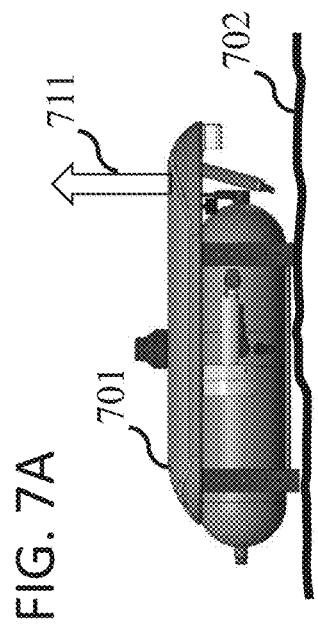
FIGS. 7A-7E illustrates a series of operations showing one embodiment of the takeoff of an AUV from the seabed, according to one embodiment of the present disclosure.
Figure 7B:
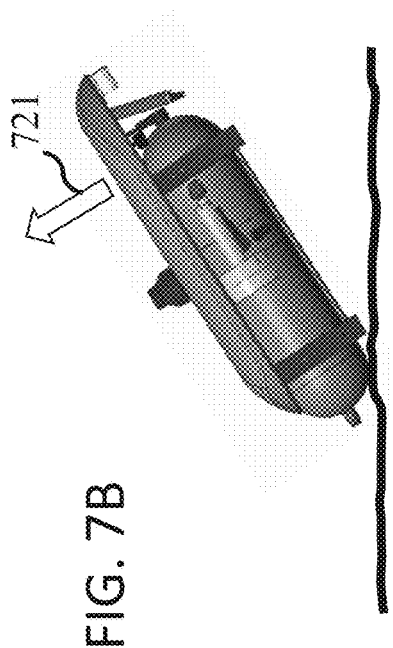
Figure 7C:
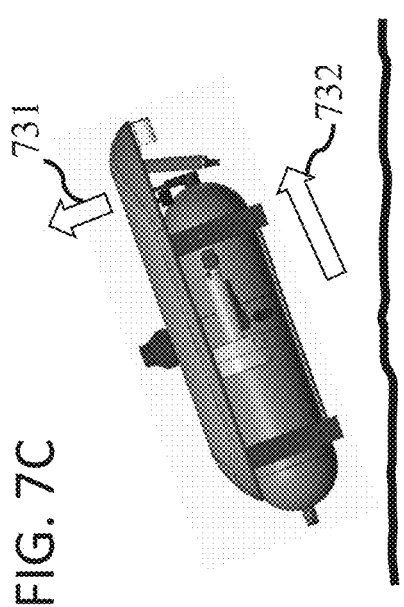
Figure 7D:
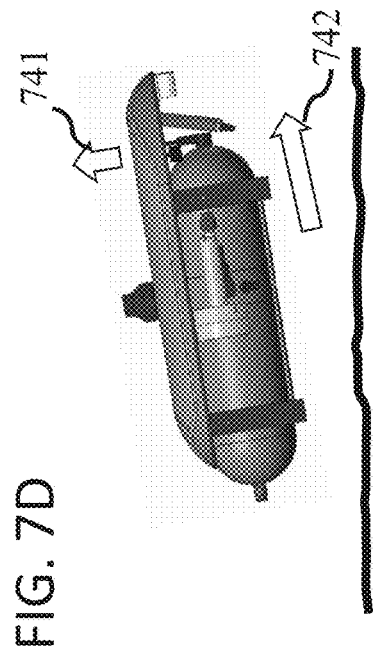
Figure 7E:
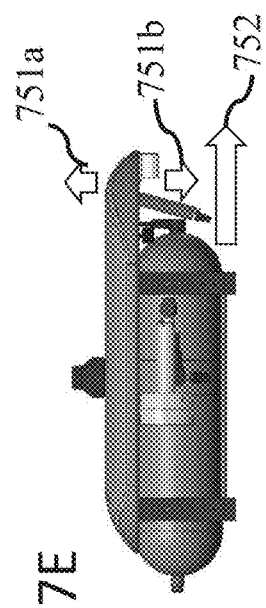

FIGS. 7A-7E illustrate a series of operations showing one embodiment of the takeoff operations for an AUV 701 from the seabed 702 and related AUV configuration. For simplicity, only FIG. 7A specifically references the AUV as 701 and the seabed as 702. In an initial position as shown in FIG. 7A, the AUV is resting on the seabed. After seismic recording is performed, a signal may be sent to the AUV to wake up, turn on, and begin to provide a vertical force 711 from the vertical thruster. In a first phase as shown in FIG. 7B, the AUV is given an upwards angle (such as between 15 to 90 degrees, between 30 to 60 degrees, or approximately 45 degrees) in relation to the seabed by operation of the vertical thruster with a vertical force 721. A horizontal force may or may not be provided by one or more horizontal thrusters in this phase. In a second phase as shown in FIG. 7C, once the vehicle nose begins to lift a certain amount, the two horizontal thrusters are engaged. At the upwards attack angle, the horizontal thrusters provide both a vertical lift and a horizontal force 732 while the vertical thruster provides a vertical thrust 731. As shown in FIG. 7D, the vertical thrust 741 may be decreased while still maintaining horizontal thrust 742. When the vehicle has lifted fully from the seabed, the vertical thrust may be gradually reduced while the AUV increases its speed through the water. In a third phase, once the AUV reaches approximately cruising speed, the shape of the buoyant body of the AUV creates sufficient lift with horizontal force 752 such that the vertical thruster is only used for depth maintenance as required by a positive vertical force 751a or negative vertical force 751b. Once the AUV is off of the seabed or other resting location, the vertical thruster is typically only used for depth and level control of the vehicle, as sufficient lift is created by the buoyant body design. Thus, the vertical thruster is configured primarily as pitch control and not for significant changes in depth. In some embodiments, the vertical thruster is not used at all during normal flight of the AUV. In one embodiment, the thrusters are designed to have a braking mechanism, so that when the AUV vehicle is in recording mode at the seabed and the AUV propulsion control is turned off, a brake mechanism may be activated to prevent the propeller blades to turn. This is important because in some situations with water current, the propeller blades may unintentionally turn in response to the water current, which would generate noise that is detectable by the seismic sensors. Thus, the propeller braking mechanism minimizes seismic disturbances generated by sea current influences on the vehicle. The braking mechanism may be a mechanical based system or device. In another embodiment, the braking mechanism may be a property of the motor itself, such that the motor requires a relatively high force to turn the motor around.

In other embodiments (particularly if the batteries of an AUV is depleted or the AUV has operational errors), to retrieve the AUV after deployment, a flat circular area on the top part of the AUV body is provided so that a suction device mounted to the end of the ROV's manipulator arm may be used to pick up and move the AUV. In another embodiment, the area on top of the AUV can be slightly curved and the suction device made to fit with the body curve or shape of the AUV. In one embodiment, the suction tool for the ROV may also have a guiding frame or feature to ease the placement of the suction on top of the AUV, which makes it easier for an ROV operator to correctly hit the top AUV surface with a suction tool. In other embodiments, the AUV may comprise a lock or latch for coupling to an ROV instead of the use of a suction device, such that the ROV may move the AUV from a first location to a second location subsea without using a suction device (which is common for ROV placement of marine seismic nodes). In other embodiments, the AUV may comprise a guide latching mechanism to dock the AUV to an ROV or other subsea station, which may operate similarly to an ROV docking system, such that the AUV may have a female receptacle and the ROV (or other device) may have a corresponding male probe (or vice versa). In one embodiment, the AUV may fly directly into a basket guided by a homing array.

The versatility of the disclosed seismic AUV allows it to be utilized in a wide variety of subsea deployment and retrieval operations. For example, the AUV is configured to move to a particular subsea location based on a transducer on the AUV communicating with another subsea device or surface vessel. The AUV can be dropped and/or deployed from a surface vessel and travel near or to the seabed at a predetermined location based on predetermined positions. After the desired number of seismic surveys has been performed with the AUV on the ocean bottom, the AUV may travel back up to the surface vessel for recovery. However, this method requires a larger power supply on the AUVs, which increases the weight, cost, and size of the AUV. As another example, the AUV may be deployed with an ROV, skid, cage, or subsea station from a surface vessel and be positioned on or near the seabed, similar to the method described in Applicant's U.S. Patent Publication No. 2016/0121983, incorporated herein by reference. The AUVs may be instructed to deploy from the ROV, skid, cage, or subsea station to a predetermined location on or near the seabed for seismic data recordings. In other embodiments, instead of instructing the AUV to fly to a predetermined position, the AUV may receive range and bearing to the target updates at regular intervals. The AUV may then calculate the necessary action to reach the target destination. In yet another embodiment, the AUV is directly guided from the onboard acoustic positioning system. In this mode, the AUV may receive instructions of heading, speed, and pitch in its route and/or path to the target destination. In some embodiments, an ROV or subsea station may be coupled to a cage with the AUVs and transfer those AUVs to the ROV or subsea station for deployment. Likewise, for recovery, the AUVs may travel to the ROV, skid, cage, or subsea station after the seismic survey is completed. The ROV may or may not facilitate recovery of the AUV into the intended recovery station. Likewise, in some situations, a robotic manipulator arm of an ROV may be used to grab, place, or position a plurality of AUVs from one subsea location to another subsea location. For example, a plurality of AUVs may be commanded to travel to a particular subsea location on the seabed, and the ROV may then travel to that subsea location and grab each of the AUVs and place them in a skid of the ROV or a subsea basket or station. In some embodiments, an ROV is used to recover the AUVs only and is not used to deploy the AUVs. In some embodiments, an ROV is not used at all and an intelligent subsea station configured with an acoustic system is used to facilitate deployment and retrieval of the AUVs. In general, the particular deployment and recovery method of the AUVs is not limited by this invention.

In operation, and as one example, once on or near the seabed (by any number of mechanisms), a plurality of AUVs may self-navigate to their predetermined deployment locations on the seabed based on position updates that are provided by a SSBL/USBL navigation system that is mounted on a surface vessel, a ROV, or subsea station (such as a cage). These positions may be provided in geographic coordinates (e.g., the WGS-84 reference system). The position information may be sent to each AUV via an acoustic communication link, such as a Cnode transducer on each AUV. The data communication packet also stimulates a reply ping from the AUV that is then used to establish its position by the SSBL/USBL system. In a different navigation method, instead of receiving or determining its position, the AUV may be given the range and bearing to its target on the seabed. In yet another navigation method, the AUV may not be given a position or range/bearing, but rather commands of which heading, speed, pitch, and altitude to fly. There are many possible ways for the AUV to navigate to an intended destination point, and the methods mentioned here is not meant to limit the disclosed AUV to any of those specific methods mentioned herein.

In one embodiment, one or more ROVs are deployed from a dynamically positioned surface vessel, along with cages or baskets that contain a plurality of AUVs. In one embodiment, each cage carries a plurality of trays with a plurality of AUVs on each cage. The ROV removes trays from these baskets, and may carry a plurality of AUVs (such as 6, 9, 12, 15, or more) on the beginning of each deployment cycle. The ROV may move to a central line in a plotted seabed grid; as the ROV moves along the line, each AUV stays in wait mode until it is updated via an acoustic command with a landing position (or range and bearing updates at regular intervals) and a command to deploy. The AUV then enters transit mode and maneuvers out of the tray housed in the ROV. Each AUV then transits to its assigned set down location on the seabed, and as each AUV nears its assigned landing position, it switches to landing mode, maneuvers to the set down position, and establishes that its resting place is within the stipulated set-down position accuracy by averaging the position updates it receives from the ROV. Alternatively, if the AUV is receiving range and bearing updates instead of operating with an absolute position, the AUV may send a status update to the onboard system when it has landed on the seabed. The onboard acoustic system may then determine the landing position via the acoustic system. The AUV then sends a confirmation message with its location to the ROV or other subsea positioning station/device. The AUV then shuts down the AUV control functions (including switching the transponder to hibernate mode), leaving only the seismic payload electronics package powered on. In other embodiments, the cNode transducer is automatically shut down or hibernated if it does not receive any pings or interrogations for a set period of time from a separate acoustic system. This procedure is repeated until the desired number of AUVs is positioned on the seabed. At this stage, the source vessel will travel along the predetermined source lines and fire the seismic source at the predetermined positions, while the AUVs acquire the seismic data.

After the seismic survey is completed, a coded wakeup signal may be sent to one or more of the AUVs to power on the AUV control functions. When taking off from the seafloor, the vertical thruster may be used to pitch the AUV's nose up off the seafloor, as discussed in relation to FIGS. 7A-7E. The force from the vertical thruster, in conjunction with the force from the horizontal thrusters that now have a significant vertical component based on the angle of the AUV, will lift the vehicle off the seafloor and move the AUV in a particular direction. As this happens, the vertical thruster will gradually power down until the required amount of upward force is achieved and the vehicle moves forward at a stable altitude above the seabed at a pitch angle of approximately between 5 and 15 degrees. As the vehicle gains speed, its body form begins to generate lift. This allows the nose-mounted vertical thruster to power down. At the intended transit/cruising speed, the AUV generates sufficient lift to counteract its negative buoyancy, such that the vertical thruster is used only for depth control and to maintain level flight.

Electronics System

In general, conventional seismic AUVs typically "added on" a seismic electronics package to an existing guidance and AUV control system of a traditional (e.g., non-seismic) AUV. Each system (e.g., an AUV control system and a seismic payload control system) would have its own battery pack, as well as separate electronic components communicating between the systems. This typical electronics system is inefficient and not integrated, making the overall seismic AUV more heavy, complicated, likely to fail, and expensive.

Figure 8:
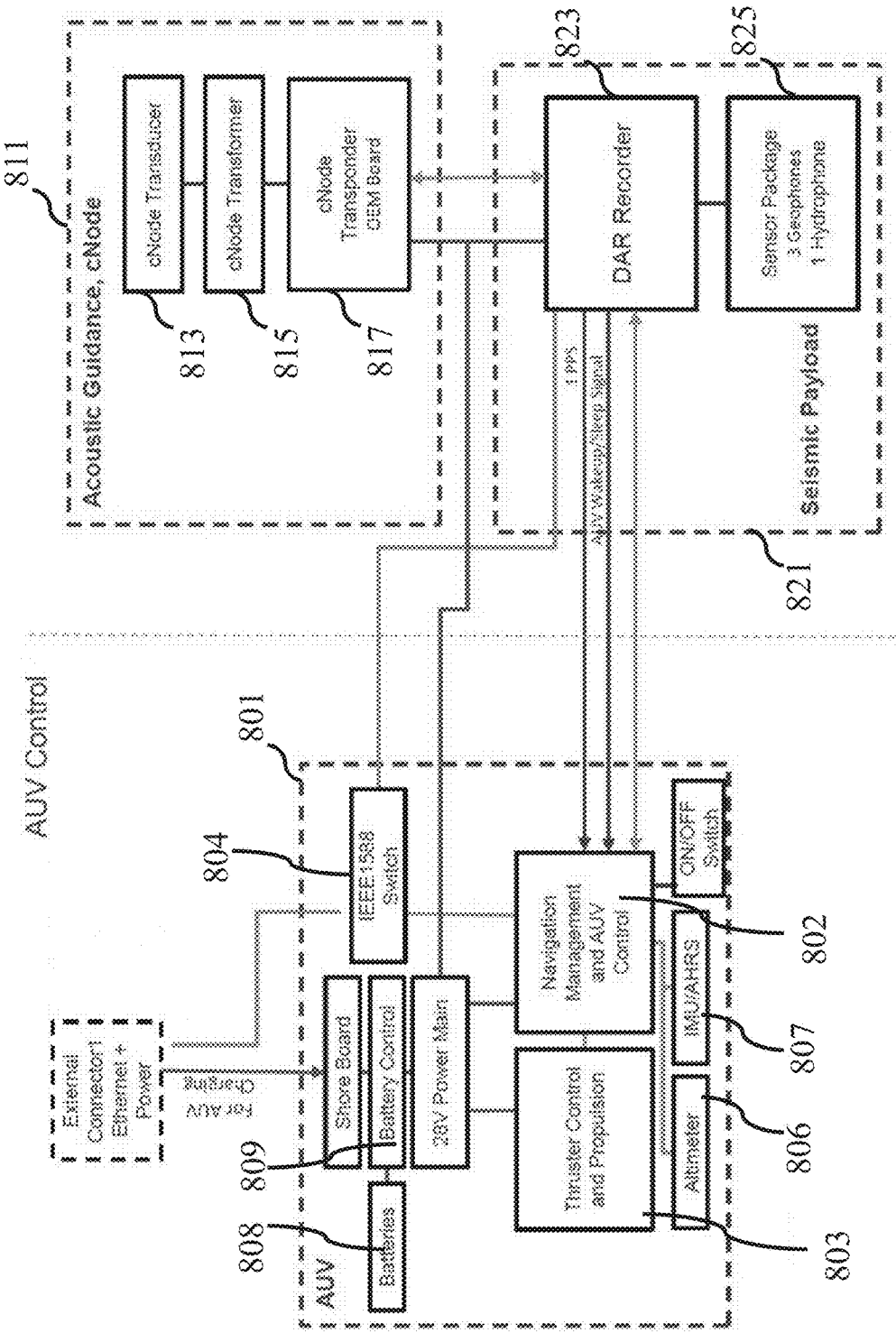
FIG. 8 illustrates a block diagram showing the electronics of one embodiment of the disclosed AUV, where the AUV control electronics is separate from the seismic payload electronics.
Figure 9:
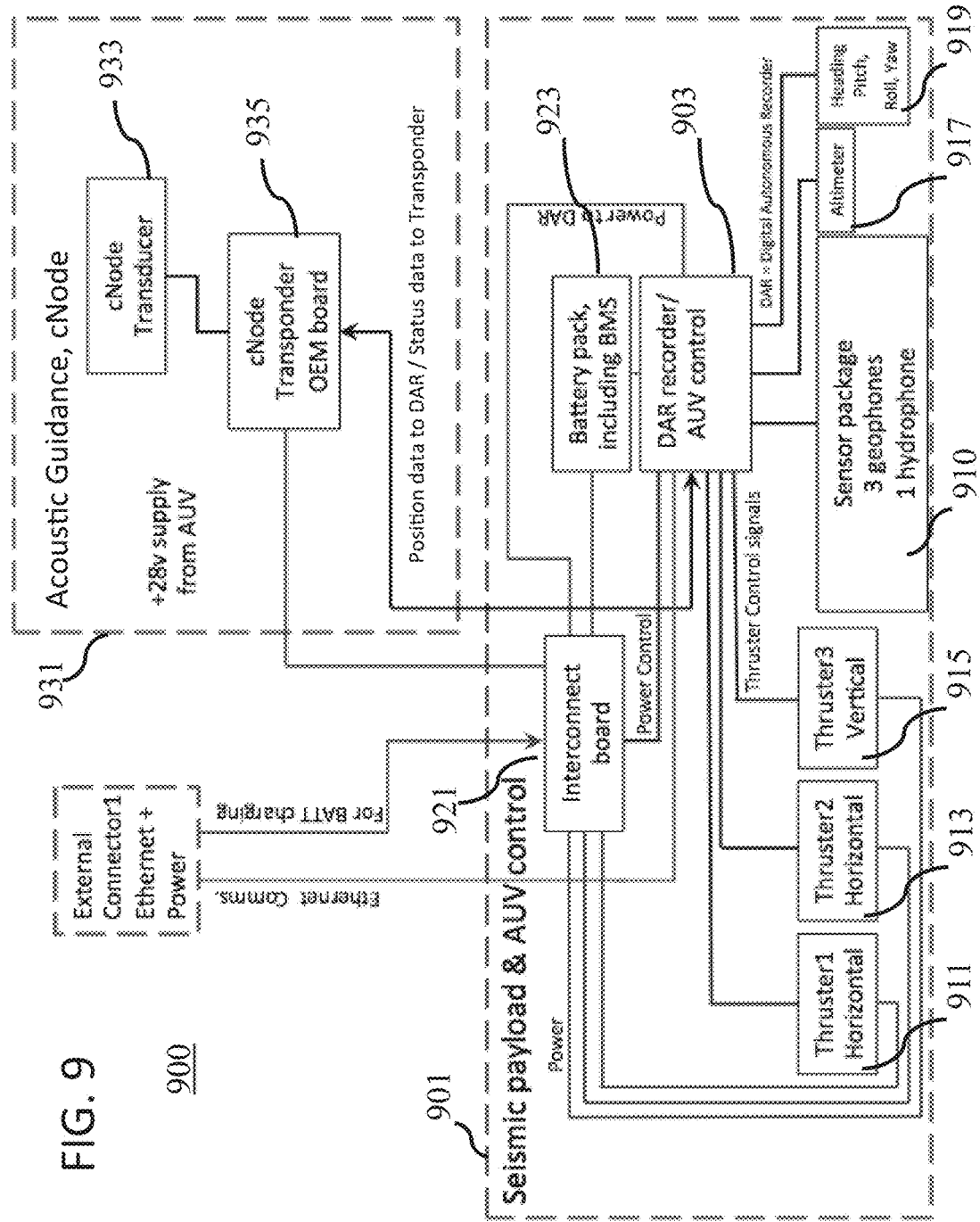
FIG. 9 illustrates a block diagram showing the electronics of one embodiment of the disclosed AUV, where the AUV control electronics is integrated with the seismic payload electronics.

FIG. 8 illustrates a block diagram showing one embodiment of the electronics of the disclosed AUV, where the AUV control electronics is separate from the seismic payload electronics. FIG. 9 illustrates a block diagram showing another embodiment of the electronics of the disclosed AUV, where the AUV control electronics is integrated with the seismic payload electronics. Thus, FIG. 8 shows a separate control system for the AUV and seismic payload and FIG. 9 shows a combined control system for the AUV and seismic payload.

As shown in FIG. 8, the electronics system 800 of the AUV may comprise AUV control system 801, acoustic guidance system 811, and seismic payload system 821. AUV control system 801 comprises computer 802 for navigation control and thruster control. AUV control system 801 comprises serial port(s) for communicating with other components/sub systems, such as an Ethernet or other data port to communicate with an external device, such as a computer system on the back deck of a marine vessel. AUV control system 801 comprises one or more thruster control and motor drivers 803 for any thrusters or propulsion system on the AUV. In some embodiments, the AUV control system may also comprise altimeter 806, inertial measurement unit (IMU) and/or attitude and heading reference system (AHRS) sensor 807, a Doppler velocity log (not shown), and Ethernet switch 804 to be able to share the Ethernet interface with the seismic recorder. In one embodiment, AUV control system 801 is connected to battery control system (BMS) 809 and to a plurality of batteries or battery packs 808. AUV control system 801 is configured to control the flight of the AUV from one subsea position to another subsea position (such as the intended seabed destination) based on input from acoustic guidance system 811.

Seismic payload system 821 comprises digital autonomous recorder (DAR) 823 and seismic payload/sensor package 825 that may consist of up to 8 channels. In one embodiment, seismic payload 825 may comprise three geophones and one hydrophone, providing a 4-component (4C) setup. The disclosed embodiment allows 4 additional components for additional sensors or other components. DAR 823 is interfaced to both AUV control system 801 and to cNode acoustic system 811. DAR 823 is able to record continuous data on the seabed for long time periods, such as months. DAR 823 is also configured to interface with and control AUV control system 801. In one embodiment, DAR 823 is the electronics component that sends AUV control system 801 into a hibernation mode and also to wake the AUV from the hibernation mode after seismic recording is finished. In addition to the seismic channels, DAR 823 may also comprise tilt meter (not shown) a that is configured to measure tilt angles in X, Y, and Z directions for the AUV. The tilt angles are also recorded by the DAR.

In one embodiment, acoustic guidance system or module 811 consists of a cNode transponder with transducer 813, transformer 815, and associated OEM electronics board 817. Acoustic guidance system 811 is coupled to and/or interfaces with DAR 823, which directs the communications from guidance system 811 to either itself (e.g., DAR 823) or AUV control system 801 depending on the type and destination of the command. Typically, during a flight of the AUV, cNode guidance system 811 will send position or range/bearing updates to the DAR, which forwards these to the AUV control, so that the AUV control system 801 can use the regular positional updates to determine how the thrusters shall be controlled to reach the target destination.

In some embodiments to conserve power, the AUV guidance system and propulsion system is powered and/or switched off during seismic recordings. During such periods of seismic data recording, there may be bio-fouling operations occurring, where the AUV electronics control briefly wakes up for a short period of time, turns the propeller to prevent bio-fouling and then the AUV electronics control system powers down. By having the AUV control system electronics separate from the seismic recorder electronics (as shown in FIG. 8), the AUV control system may power itself off during the recording period to preserve power, requiring the seismic recorder to activate the AUV control system again when the recording period is over.

As shown in FIG. 9, the electronics system 900 of the AUV may comprise a combined seismic payload and AUV control system 901 and acoustic guidance system 931. Combined seismic payload and AUV control system 901 comprises DAR 903 that both records the seismic data and also manages the AUV control functions. Thus, DAR 903 integrates a conventional DAR (such as DAR 823) with an AUV control system computer (such as AUV control system 802). Sensor package 910 may be an eight channel sensor package similar to that described in relation to FIG. 8.

Compared to prior DARs, DAR 903 is configured with a computer system that can also handle the computing needed for AUV navigation control and thruster control. Compared to prior DARs, DAR 903 is configured with motor drives for any propulsion system, such as a plurality of thrusters, shown as blocks 911, 913, and 915, so that DAR 903 can direct control the thrusters. Similar, DAR 903 is configured with serial ports to interface with various other external devices, such as altimeter 917, IMU sensor 919, a homing array, etc. DAR 903 may be coupled to an interconnection or Ethernet board 921, which is coupled to acoustic guidance system 931 and is configured to communicate with an external device for data and/or power transfer. Any internal Ethernet switch existing in the prior art between the different components of the AUV is removed, as only the DAR needs to be connected to Ethernet/data connections. The DAR is coupled to and/or comprises a battery pack and battery control system (BMS) 923. The DAR may have a direct connecting for charging the batteries. Similar to existing FIG. 8, acoustic guidance system 931 comprises cNode transducer 933, which provides receiving and transmitting capabilities, and corresponding cNode OEM board 935.

The embodiment disclosed in FIG. 9 provides numerous benefits. For example, when the AUV has landed in recording position, no computing power is needed for AUV control anymore, so there will not be any disturbance with the recording of the seismic data that is found in conventional AUVs. As another example, the integrated electronics package that combines and/or integrates the seismic recording components of a seismic node with the guidance system of an AUV as shown in FIG. 9 eliminates duplicative components, such as CPU, batteries, battery charger, network switch, external connector, etc. This also eliminates any necessary connection and handshake protocols and operations between the two systems. In one embodiment, the combined seismic system and the guidance system use a common power source, which reduces the AUV weight, cost, and complexity and is thereby more reliable. Further, because the weight and size may be reduced, less buoyancy is needed, which is typically one of the highest cost drivers for the overall cost of an AUV.

However, using a common power source (as shown in FIG. 9) presents various challenges, such as electronic interference and separate voltage requirements. In one embodiment, where the AUV and seismic recorder electronic systems runs at the same time, the seismic recorder is designed to run at the same voltage as the AUV control to decrease any electrical interference between the two systems. In another embodiment, where the AUV and seismic recorder electronic systems operate at the same time and use the same power source, a DC-DC step down converter may be switched on to enable the seismic recorder to be connected to the same battery as AUV control (e.g., the Digital Autonomous Recorder (DAR) and other seismic recording devices typically operate on a lower voltage than the AUV control system, which must be taken into account with a common power source).

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of a node and the wireless systems on the node and/or vessel are within the scope of the invention. For example, the AUV may be of any configuration, and may be designed to couple to the seabed or merely near the seabed. The pressure vessel may or may not be comprised of carbon fiber components or generally be in the shape of a cylindrical tube. The DAR may or may not be an integrated computer that combines separate AUV control functionality into the DAR. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An autonomous underwater vehicle (AUV) for recording seismic signals on the ocean bottom during a marine seismic survey, the AUV comprising:
    a body that is positively buoyant;
    a pressure vessel coupled to the buoyant body that houses a plurality of electronic components within the pressure vessel, wherein the pressure vessel comprises a first end coupled to a second end by a metallic ring, wherein the first and second ends are substantially non-metallic;
    a propulsion system configured to propel and steer the AUV while travelling underwater; and
    one or more seismic sensors.

2. The AUV of claim 1, wherein an exterior portion of the pressure vessel comprises one or more carbon-fiber components.

3. The AUV of claim 1, wherein the first and second ends are substantially cylindrical.

4. The AUV of claim 1, further comprising a plurality of electronic components external to the pressure vessel and coupled to the electronics components within the pressure vessel through the metallic connector.

5. The AUV of claim 1, wherein the propulsion system comprises a plurality of thrusters, wherein at least one of the plurality of thrusters comprises a vertical thruster.

6. The AUV of claim 5, wherein the vertical thruster is configured to provide the AUV with a negative vertical force when operated in a first direction and a positive vertical force when operated in a second direction.

7. The AUV of claim 1, further comprising one vertical thruster that is configured to provide all vehicle pitch control for the AUV.

8. The AUV of claim 7, wherein the vertical thruster is configured to provide lift-off force from the seabed for the AUV for raising at least one end of the AUV from the seabed.

9. The AUV of claim 1, wherein the propulsion system comprises a plurality of thrusters, wherein at least one of the plurality of thrusters is coupled to the pressure vessel by a pressure sealed connector or penetrator.

10. The AUV of claim 1, further comprising at least one external electronic device coupled to the pressure vessel, wherein the at least one external electronic device comprises a first flat surface configured to electrically couple with a second flat surface of the pressure vessel for data communications.

11. The AUV of claim 10, wherein one or more data connectors is located within a first opening on the first flat surface and a second opening on the second flat surface.

12. The AUV of claim 1, wherein the plurality of thrusters are rim driven thrusters.

13. The AUV of claim 1, further comprising one or more seabed landing legs.

14. The AUV of claim 1, wherein the buoyant body has a shape that provides lift to the AUV during horizontal movement of the AUV.

15. The AUV of claim 1, wherein the AUV has a negative buoyancy at all times in a body of water.

16. The AUV of claim 1, further comprising an altimeter located entirely within the pressure vessel.

17. The AUV of claim 1, comprising an integrated seismic and AUV control system that is configured to control the one or more seismic sensors and the propulsion system.

18. An autonomous underwater vehicle (AUV) for recording seismic signals on the ocean bottom during a marine seismic survey, the AUV comprising:
    a body that is positively buoyant;
    a pressure vessel coupled to the buoyant body that houses a plurality of electronic components within the pressure vessel, wherein the pressure vessel comprises a first part coupled to a second part by a metallic ring, wherein the first and second parts are substantially cylindrical;
    a propulsion system configured to propel and steer the AUV while travelling underwater; and
    one or more seismic sensors located within the pressure vessel.

19. The AUV of claim 18, wherein the first and second parts are substantially non-metallic.

20. The AUV of claim 18, wherein the first part comprises a first end, and the second part comprises a second end, wherein the first and second ends are in the shape of a hemisphere.

21. The AUV of claim 18, wherein the first part comprises a first end, and the second part comprises a second end, wherein the first and second ends are substantially flat.

22. An autonomous underwater vehicle (AUV) for recording seismic signals on the ocean bottom during a marine seismic survey, the AUV comprising:
    a body that is positively buoyant;

a pressure vessel coupled to the buoyant body that houses a plurality of electronic components within the pressure vessel;

a propulsion system configured to propel and steer the AUV while travelling underwater;

one or more seismic sensors located within the pressure vessel; and at least one external electronic device coupled to the pressure vessel, wherein the at least one external electronic device comprises a first flat surface configured to electrically couple with a second flat surface of the pressure vessel for data communications; and wherein the pressure vessel comprises a first part coupled to a second part by a metallic connector, wherein the second flat surface of the pressure vessel is located on the metallic connector.

23. The AUV of claim 22, wherein one or more data connectors is located within a first opening on the first flat surface and a second opening on the second flat surface.

24. The AUV of claim 22, wherein one or more data connectors is located within a first opening on the first flat surface and a second opening on the second flat surface.

25. The AUV of claim 22, wherein the at least one external electronic device comprises a thruster.

26. The AUV of claim 22, wherein the at least one external electronic device comprises an acoustic device.

* * * * *